(12) United States Patent
Argentar

(10) Patent No.: US 7,403,943 B2
(45) Date of Patent: Jul. 22, 2008

(54) PATTERN DISCOVERY USING PINA AND PIBA ARRAYS

(75) Inventor: David Ruben Argentar, Bear, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 282 days.

(21) Appl. No.: 11/402,774

(22) Filed: Apr. 12, 2006

(65) Prior Publication Data

US 2006/0253518 A1 Nov. 9, 2006

Related U.S. Application Data

(60) Provisional application No. 60/672,176, filed on Apr. 15, 2005.

(51) Int. Cl.
*G06F 17/30* (2006.01)
(52) U.S. Cl. .......................................... 707/6; 707/101
(58) Field of Classification Search .................... 707/1, 707/6, 100, 101; 708/100, 490; 235/494
See application file for complete search history.

(56) References Cited

U.S. PATENT DOCUMENTS 5,577,249 A * 11/1996 Califano ..................... 707/100
5,668,988 A * 9/1997 Chen et al. .................. 707/101
6,718,336 B1 * 4/2004 Saffer et al. ................. 707/102
7,048,198 B2 * 5/2006 Ladas et al. ................. 235/494
2003/0220771 A1 11/2003 Vaidyananthan et al.

* cited by examiner

*Primary Examiner*—Don Wong
*Assistant Examiner*—Marc R Filipczyk

(57) ABSTRACT

Methods for finding patterns in symbol sequences and a computer readable medium having instructions for performing the methods. Symbol patterns common to each 2-tuple of sequences are represented by a position index numerical array (PINA) or a position index binary array (PIBA). A PINA is a set of position indices each denoting the location in a reference sequence where each symbol in the pattern occurs. A PIBA is a set of bits. Each bit corresponding to a symbol in the identified pattern has a first value. Patterns are combined using the PIBA representations of one tuple taken with the PINA representations of the other tuple. Arrays representing patterns in one tuple are interrogated by a PINA representing each pattern in the other tuple and those places having the first value are identified. The symbols in the reference sequence corresponding to the identified places in the PIBA define the pattern.

16 Claims, 22 Drawing Sheets

|   | Position Index | | | | | | | | | | | | | | | | | | | | | | |
|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
| 0 | M | D | V | L | S | P | G | Q | G | N | N | T | T | S | P | P | A | P | F | E | | | |
| 1 | M | E | S | P | G | A | Q | C | A | P | P | P | P | A | G | S | | | | | | | |
| 2 | M | S | P | L | N | Q | S | A | E | G | L | P | Q | E | A | S | N | R | S | | | | |
| 3 | M | D | F | L | S | S | D | Q | N | A | T | S | E | E | L | L | N | R | M | M | P | S | K |
| 4 | M | A | L | S | Y | R | S | V | E | L | Q | S | A | I | P | E | H | I | Q | S | | | |

Sequence Index

FIGURE 1

S0 MOT Table

| A | C | D | E | F | G | H | I | K | L | M | N | P | Q | R | S | T | V | W | Y |
|---|---|---|---|---|---|---|---|---|---|---|---|---|---|---|---|---|---|---|---|
| 16 | 1 | 19 | 18 | 6 |   | 8 |   |   |   |   |   | 3 | 0 | 9 | 5 | 7 |   | 4 | 11 2 |
|   |   |   |   |   |   |   |   |   |   |   |   |   |   |   | 10 14 |   |   | 13 | 12 |
|   |   |   |   |   |   |   |   |   |   |   |   |   |   |   | 15 |   |   |   |   |
|   |   |   |   |   |   |   |   |   |   |   |   |   |   |   | 17 |   |   |   |   |

S1 MOT Table

| A | C | D | E | F | G | H | I | K | L | M | N | P | Q | R | S | T | V | W |
|---|---|---|---|---|---|---|---|---|---|---|---|---|---|---|---|---|---|---|
| 5 | 7 | 1 |   |   | 4 |   |   |   |   |   |   | 0 | 3 | 6 |   | 2 |   |   |
| 8 |   |   |   |   | 14 |  |   |   |   |   |   |   | 9 |   |   | 15 |   |   |
| . |   |   |   |   |   |   |   |   |   |   |   |   | 10 |  |   |   |   |   |
|   |   |   |   |   |   |   |   |   |   |   |   |   | 11 |  |   |   |   |   |
|   |   |   |   |   |   |   |   |   |   |   |   |   | 12 |  |   |   |   |   |

Row Index → | Position Indices in $S_0$ MOT

PATTERN DISCOVERY USING PINA AND PIBA ARRAYS

This application claims the benefit of U.S. Provisional Application 60/672,176, filed Apr. 15, 2005, the entire content of which is herein incorporated by reference.

CROSS REFERENCE TO RELATED APPLICATIONS

Subject matter disclosed herein is disclosed and claimed in the following copending applications, all filed contemporaneously herewith and all assigned to the assignee of the present invention:

Fundamental Pattern Discovery Using The Position Indices Of Symbols In A Sequence Of Symbols (CL-3064);

Identifying Patterns of Symbols In Sequences of Symbols Using A Binary Array Representation of The Sequence (CL-3079);

Eliminating Redundant Patterns in a Method Using Position Indices of Symbols to Discover Patterns In Sequences of Symbols (CL-3070); and Using Binary Array Representations of Sequences to Eliminate Redundant Patterns In Discovered Patterns of Symbols (CL-3073).

FIELD OF THE INVENTION

The present invention relates to a computationally efficient computer-implemented method of finding patterns in sequences of symbols and to a computer readable medium having instructions for controlling a computer system to perform the method.

BACKGROUND OF THE INVENTION

Prior art methods of discovering patterns of symbols in a family of symbol sequences are computationally intensive. The computational intensity is dependent upon the lengths of the sequences (i.e., number of symbols in each sequence) and the size of the alphabet (i.e., the number of distinct symbols found in each sequence). Running time (i.e., the number of computational steps required) for the prior art methods tends to increase in proportion to the product of the lengths of the sequences and decrease in proportion to the alphabet size.

Patterns that occur in (i.e., are common to) "q" number of sequences in a family of "k" sequences are said to have q "levels of support". For example, patterns that are common to two sequences are said to have a level of support of two. Patterns that are common to a greater number of sequences in a family are said to have a greater level of support. Patterns with greater levels of support are usually more descriptive of so-called "features", or properties, of the underlying system. In biology, for example, these features characterize chemical or physical properties of proteins or nucleic acids.

The method of published United States Patent Application 2003-0220771-A1, Vaidyanathan el al., assigned to the assignee of the present invention, discovers patterns in two or more sequences. The method of this application first discovers patterns of symbols in pairs of sequences, then finds patterns of symbols at increasingly higher levels of support based upon the patterns found in the pairs. The identity of the symbols in the patterns is retained throughout the practice of this method, and all calculations are done with the alphabet of those symbols. Retaining the symbol identity may detract from the efficiency of the method.

In view of the foregoing it is believed advantageous to be able to discover patterns common to two or more sequences in a family of sequences in a more computer-efficient manner.

SUMMARY OF THE INVENTION

In a first aspect the present invention is directed to methods for identifying patterns in a set of k-sequences of symbols, where k is greater than two (k>2) and wherein the location of a symbol in a sequence is denoted by a position index. In another aspect the present invention is directed to a computer-readable medium containing instructions for controlling a computer system to discover one or more patterns in two or more sequences of symbols by performing the method described.

The patterns of symbols produced by the combination of "n" sequences is termed an "n-tuple" ("tuple of order n"). Any n-tuple, for order n=2 to order n=(k−1), is identifiable by the sequence indices of the n sequences combined to produce the patterns within that n-tuple.

As a first step in accordance with the method of the present invention patterns of symbols produced by each pair-wise combination of sequences (each "2-tuple") are identified. Each identified pattern of symbols is represented by either a position index numerical array (PINA) or a position index binary array (PIBA). The position index numerical array (PINA) representation of a pattern is a set of position indices, each of which denotes the location in a selected reference sequence at which each symbol in the pattern occurs. The position index binary array (PIBA) representation of a pattern is a set of binary digits. The binary digit in each place in the array that corresponds to a location in the selected reference sequence of a symbol in the identified pattern has a first predetermined binary value (e.g., a binary "1"). All of the other binary digits in the array have a second predetermined binary value (i.e., a binary "0").

The pattern representations of each tuple at any tuple order "n" may be combined with the pattern representations of all other tuples at that order "n" sharing a common reference sequence, provided patterns exist in each n-tuple.

Thus, as a second step of the method of the present invention all 2-tuples that share a common reference sequence are taken in pair-wise combinations to identify patterns common to 3-tuples also sharing that same reference sequence. The 2-tuples may be pair-wise combined using either: (i) the position index numerical array (PINA) representations of patterns; (ii) the position index binary array (PIBA) representations of patterns; or (iii) the position index binary array (PIBA) representations of one 2-tuple taken with the position index numerical array (PINA) representations of the other 2-tuple.

In the first instance, when using the position index numerical array (PINA) representations of the patterns in each 2-tuple, patterns in the resulting 3-tuple are identified from the position index numerical arrays (PINAs) produced by the intersection of the set of position indices in each position index numerical array (PINA) in one 2-tuple with the set of position indices in each position index numerical array (PINA) in the other 2-tuple. The sets of position indices are intersected by sequentially comparing each position index of one pattern with each of the position indices of the other pattern. The position index numerical array (PINA) representing the identified pattern in the resulting 3-tuple is converted into its corresponding symbols by mapping the indices in the numerical array to the respective symbols in the reference sequence.

In the second instance, when using the position index binary array (PIBA) representations of patterns in each 2-tuple, the set of binary digits of the position index binary array (PIBA) of each pattern from one 2-tuple is intersected with the set of binary digits of the position index binary array (PIBA) of each pattern from the other 2-tuple. Each intersection of these binary arrays defines the position index binary array (PIBA) representation of a pattern in a 3-tuple. The intersection is accomplished logically, as by performing a logical AND operation in a bit-by-bit manner on the binary arrays. The binary array representation produced by the logical AND operation is used to identify the common pattern. Using the places in the position index binary array (PIBA) produced by the intersection having the first predetermined binary value as a guide, the symbols in corresponding locations in the reference sequence are identified. These symbols comprise the symbols in the identified pattern in the 3-tuple.

In the hybrid combination technique, a position index binary array (PIBA) representing each pattern in a first identified 2-tuple of patterns is created. The position index numerical array (PINA) representing each pattern of symbols in the second identified 2-tuple of patterns is also created. The binary arrays are assembled into a "scoreboard". Each position index in the position index numerical array (PINA) representing each pattern in the second 2-tuple is used to interrogate the places in the "scoreboard" of binary arrays from the first 2-tuple. As a result of the interrogation those places in each binary array in the first 2-tuple having the first predetermined binary value are identified. The symbols at the locations in the reference sequence corresponding to the identified places in the position index binary arrays (PIBAs) (i.e., those places having the first predetermined binary value) define the identified pattern of symbols. The binary arrays that are assembled into the scoreboard may be indirectly created by first creating the position index numerical arrays (PINAs) for each pattern in the first 2-tuple and thereafter converting each of those numerical arrays into its corresponding binary array.

In order to avoid redundancies produced by combinations at the 2-tuple order, sequences should be combined in either ascending sequence index order or descending sequence index order.

-o-0-o-

The teachings of the present invention as summarized above may be extended to higher order n-tuples.

A method in accordance with the present invention may also include steps wherein the pattern representations of each tuple at any tuple order "n", for n=3 to n=(k−1), may be combined with the pattern representations of all other tuples at that order "n" sharing a common reference sequence, provided patterns exist in each n-tuple. Such pair-wise combinations may again be effected using either: (i) the position index numerical array (PINA) representations of patterns; (ii) the position index binary array (PIBA) representations of patterns; or (iii) the hybrid method using position index binary array representations of one tuple taken with the position index numerical array representations of the other tuple.

Combination of such higher order n-tuples may produce resultant tuples at the next-higher order [i.e., at order (n+1)] or may "leapfrog" to still-higher orders [i.e., orders (n+2) or above], up to the (k−1)-order. The order of the resultant tuple is determined by the number of different sequence indices in the tuple identifiers of one tuple as against the sequence indices in the tuple identifier of the other tuple being pair-wise combined.

The "leapfrog effect" is especially advantageous when large numbers of long sequences are involved since it allows patterns having high levels of support to be found without the necessity of first finding all patterns at all lower levels of support.

However, pair-wise combinations of n-tuples of the same higher order also results in redundant pattern identifications. In order to reduce redundant pattern identifications the representations of the patterns in a first n-tuple should be only combined with pattern representations of those other n-tuples that include in their tuple identifiers at least one sequence index greater than the sequence indices included in the tuple identifier of the first n-tuple. Redundancies involving pair-wise combinations of n-tuples that share the same reference sequence may be eliminated provided that, aside from the reference sequence, all of the sequence indices in the identifier of one n-tuple are different from those of the other n-tuple.

It also lies within the contemplation of a method of the present invention that pattern representations in any higher order tuple may also be combined pair-wise with the pattern representations in any selected lower-order tuple. That is, the representations in any n-tuple may be combined with the pattern representations in any selected m-tuple, where m may have any integer value from 2 to (n−1).

Such pair-wise combinations may again be effected using either: (i) the position index numerical array (PINA) representations of patterns; (ii) the position index binary array (PIBA) representations of patterns; or (iii) the hybrid method using position index binary array representations of one tuple taken with the position index numerical array representations of the other tuple.

The resulting tuple may be one or more higher orders (leapfrog effect), again depending upon the number of different sequence indices in the tuple identifiers of the tuples combined.

Pair-wise combinations of an n-tuple with a lower order tuple may also result in redundant pattern identifications. Accordingly, in order to reduce redundant pattern identifications the representations of the patterns in an n-tuple should be only combined with pattern representations of a lower-order tuple that includes in its tuple identifier at least one sequence index greater than the sequence indices included in the tuple identifier of the n-tuple. To avoid redundancies involving pair-wise combinations of representations of patterns in an n-tuple with a lower order tuple that shares the same reference sequence, all of the sequence indices of the lower order m-tuple other than the reference sequence index must be different from those of the n-tuple.

The most preferred pair-wise combinations are those involving the representations of patterns in a higher order n-tuple [n=3 to n=(k−1)] with the representations of patterns in a 2-tuple that shares the same reference sequence and whose tuple identifier includes a sequence index greater than the sequence indices included in the identification of the n-tuple, provided there exists patterns in each n-tuple and 2-tuple. Combining an n-tuple with such a 2-tuple insures that no redundant pattern representations are produced by the comparison, while finding all patterns at successive levels of support.

BRIEF DESCRIPTION OF THE FIGURES

The invention will be more fully understood from the following detailed description, taken in connection with the accompanying drawings, which form a part of this application and in which:

FIG. 1 is a Table showing sequences $S_0$ through $S_4$ with the position indices of each symbol being indicated;

FIG. 2 depicts Master Offset Tables ("MOT tables") for sequences $S_0$ and $S_1$ of the set of sequences of FIG. 1;

FIG. 3 shows the Pattern Map corresponding to the Master Offset Tables of FIG. 2;

DETAILED DESCRIPTION OF THE INVENTION

Figure 4:
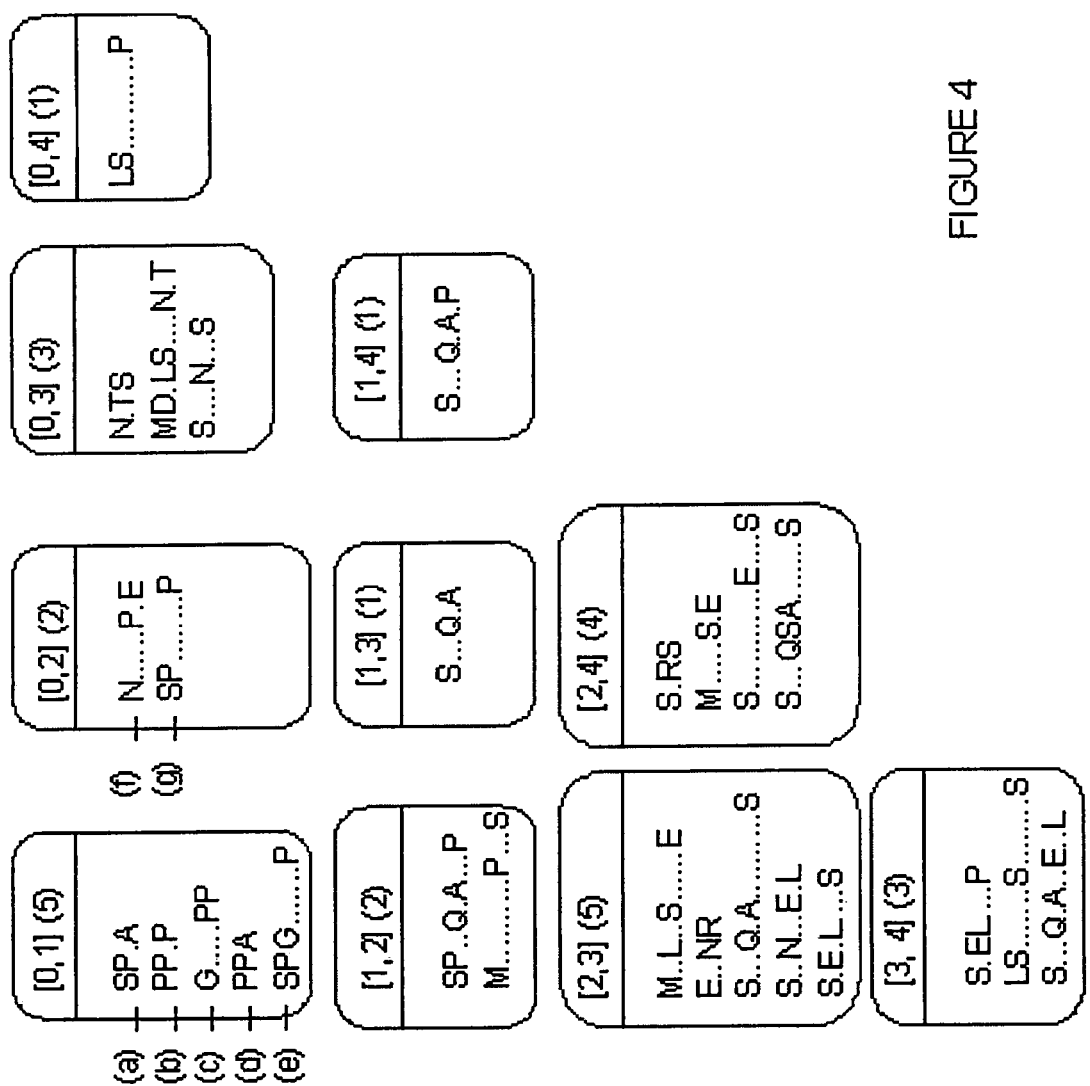
FIG. 4 is a Table showing the identified patterns of symbols common to each 2-tuple of sequences $S_0$ through $S_4$.

Throughout the following detailed description, similar reference numerals refer to similar elements in all figures of the drawings.

In one aspect the present invention is directed toward a computer-implemented method useful in identifying patterns of symbols in a set "S" containing "k" sequences of symbols, where k is greater than two (where k>2), that is, there are three or more patterns, thus:

$$S=\{S_0, S_1, S_2, \ldots, S_{k-1}\}.$$

The basic implementation of the method of the present invention may be understood by considering the following set of five sequences $S_0$ through $S_4$:

$S_0$: MDVLSPGAGNNTTSPPAPFE;
$S_1$: MESPGAQCAPPPPAGS;
$S_2$: MSPLNQSAEGLPQEASNRS;
$S_3$: MDFLSSSDQNATSEELLNRMPSK;
$S_4$: MALSYRSVELQSAIPEHIQS.

By convention, each sequence is assigned a predetermined sequence index, indicated by the respective subscripts 0, 1, 2, 3, and 4, to order the sequences. The sequence indexes (or the more preferable plural form used herein, "indices") are assigned in any desired manner. Sequences $S_0$ through $S_4$ are derived from a biological system of G-coupled protein receptors and have been modified better to illustrate the principles of the present invention.

It should be noted that each sequence $S_0$ through $S_4$ has an arbitrary length determined by the source from which the sequence is derived. The sequences may have equal, or as seen above, different lengths.

The present invention is independent of the particular alphabet in which sequences are presented. In fact, a useful preliminary step is to discover all of the symbols in the alphabet in which the sequence data are written. The term "alphabet" is meant to include any collection of letters or other characters (including numerals). For example, sequences describing DNA are typically written in a four-symbol alphabet consisting of the symbols {A,G,C,T}. Protein sequences are written in a twenty-symbol alphabet representing the amino acids, consisting of the symbols {A,C,D,E,F,G,H,I,K, L,M,N,P,Q,R,S,T,V,W,Y}.

POSITION INDEX FIG. 1 is a tabular representation of the sequences $S_0$ through $S_4$ arranged in row and column format. The sequence index for each sequence is denoted in the left hand column of numerals (i.e., 0, 1, 2, 3, 4).

The top row of numerals in the table, labeled "Position Index", ascribes numeric values to locations in the sequences (from 0, 1, . . . , 22 for the lengths of sequences illustrated). The location of any given symbol in a sequence is denoted by its "position index", that is, the numeric value of the location that the symbol occupies in that sequence, as measured from the beginning of the sequence. It is noted that, by convention, the first location in each sequence is assigned the position index 0.

A "position index" of a symbol has meaning only relative to the particular sequence in which the symbol occurs. For example, in sequence $S_0$ the symbol "M" occupies location 0 and, thus, has position index 0; the symbol "S" occupies locations 4 and 13 and, thus, has position index 4 and position index 13. In the sequence $S_3$ the symbol "M" occupies locations 0 and 19 and, thus, has position indices 0 and 19; the symbol "S" occupies locations 4, 5, 6, 12 and 21 and thus, has corresponding position indices 4, 5, 6, 12 and 21, respectively.

Conversely, in sequence $S_0$, at the locations corresponding to position indices 5, 14, 15 and 17, the symbol "P" appears. In sequence $S_3$ the locations corresponding to position indices 5, 14, 15, and 17 are occupied by the symbols "S", "E", "L", and "N", respectively.

A "pattern" is defined as any distributed substring of two or more symbols that occurs in (i.e., is common to) at least two sequences. The symbols comprising a pattern may be separated within the sequence by gaps. In this description of the present invention, when expressing patterns, dots will be used represent gaps, i.e., locations where the symbols in the two sequences do not match, and are thus considered placeholder positions in the pattern.

In general, a sequence may be considered in combination with one or more of the other sequences in the set S. The group of patterns of symbols common to combinations of sequences is known as an "n-tuple", where "n" is the order of the tuple denoting the number of sequences being combined. For any set of k sequences, assuming the numeration of the sequence index begins at zero, the order number "n" may take any value up to (k−1). For example, as used herein, the group of patterns of symbols produced when sequences are taken together in pair-wise combination is referred to as a "2-tuple" (i.e., n=2). The group of patterns of symbols produced when sequences are considered in combination three-at-a-time may be may be referred to as a "3-tuple" (i.e., n=3).

Identification of Patterns The first step of a method in accordance with the present invention is the identification of patterns of symbols common to each pair-wise combination of sequences (i.e., identifying the 2-tuple of patterns).

Preferably, any of the pattern identification methods disclosed in published U.S. patent application Ser. No. 2003-0220771-A1, Vaidyanathan, el al., assigned to the assignee of the present invention, may be used. Published U.S. patent application Ser. No. 2003-0220771-A1 is hereby incorporated by reference herein.

The basic implementation of the method of the referenced incorporated patent application in the context of the present invention may be understood by considering the twenty-place sequence $S_0$ and the sixteen-place sequence $S_1$ of the set of sequences $S_0$ through $S_4$, thus:

$S_0$: M D V L S P G A G N N T T S P P A P F E;
$S_1$: M E S P G A Q C A P P P P A G S.

The MOT Table Data Structure The method of the referenced incorporated patent application is based upon the translation of a sequence written as a list of symbols into a position-based data structure that groups, for each symbol in the sequence, the position in the sequence occupied by each occurrence of that symbol, that is, by its position index. This position-based data structure is called the "Master Offset Table", also referred to as a "MOT table".

The MOT tables for $S_0$ and $S_1$ are as shown in FIG. 2. Each MOT table has a column corresponding to each symbol in the alphabet. Each column stores, as elements therein, the location (by position index) of every occurrence in the sequence of the symbol corresponding to that column.

Thus, from the $S_0$ MOT table it may be observed that the symbol "S" occurs at the fourth and thirteenth position indices and the symbol "P" occurs at the fifth, fourteenth, fifteenth and seventeenth position indices in the first sequence $S_0$.

Similarly, from the $S_1$ MOT table it may be observed that the symbol "S" occurs at the second and fifteenth position indices and the symbol "P" occurs at the third, ninth, tenth, eleventh, and twelfth position indices in the second sequence $S_1$.

Pattern Map Data Structure For all of the symbols in one sequence the difference-in-position between each occurrence of a symbol in that sequence and each occurrence of that same symbol in the other sequence is determined. The difference-in-position between an occurrence of a symbol of interest in the first sequence $S_0$ and an occurrence of the same symbol in the second sequence $S_1$ is the sum of:
(i) the number of places in the first sequence $S_0$ lying between the symbol of interest and the end of the first sequence $S_0$; and
(ii) the number of places from the beginning of the second sequence $S_1$ until the occurrence of that symbol of interest in the second sequence $S_1$.

Difference-in-position is determined by constructing another data structure called the "Pattern Map". The Pattern Map is a table of difference-in-position values. In forming the Pattern Map only index differences from corresponding MOT columns are computed (i.e., A's from A's, C's from C's, etc.). By focusing on position differences the computational cost of exhaustive symbol-by-symbol comparison of the two sequences is avoided. The value of each row number in the Pattern Map corresponds to a value of a difference-in-position of a corresponding number of position indices. Thus, row "6" of the Pattern Map lists symbols that have a difference-in-position value of six, that is, that are six position indices apart.

Figure 3:
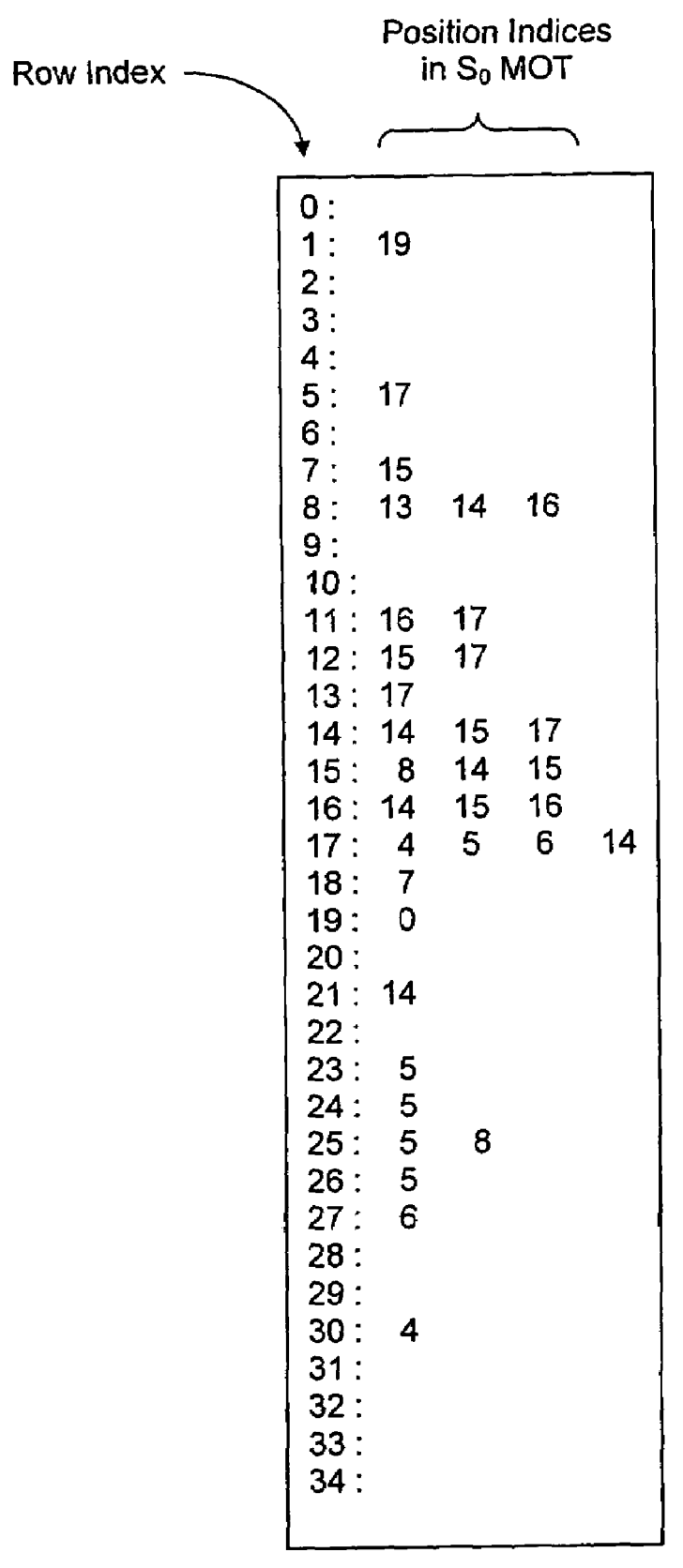

The value of a difference-in-position between a symbol in the sequence $S_0$ and an occurrence of that same symbol in the sequence $S_1$ can be determined in several ways. In a preferred implementation, in order to compute the Pattern Map, all of the indices in one MOT table (e.g., the MOT table corresponding to sequence $S_1$) were offset by the length of the sequence In effect, the sequence $S_1$ and the sequence $S_0$ are concatenated. It should be noted that the order of concatenation is immaterial. For clarity of presentation the following description describes a situation where sequence $S_1$ follows the sequence $S_0$. This offset results in non-negative indices in the Pattern Map. Then, for each element of each MOT table column, the index in $MOT_0$ is subtracted from the offset index of $MOT_1$. The result (i.e., the difference-in-position) is the row index of the Pattern Map, and the value stored in that row is the position index from $MOT_0$ (again by convention). FIG. 3 shows the Pattern Map for sequences $S_0$, $S_1$ corresponding to the MOT tables of FIG. 2.

Referring to FIG. 3 the number to the left of the colon is the Pattern Map row index. The numbers to the right of the colon are position indices from $MOT_0$.

The Pattern Map tabulates the symbols that have a given difference-in-position (that is, symbols that are that distance apart). The symbols are identified in the Pattern Map by their position index in the sequence The Pattern Map sets forth, for each value of a difference-in-position, the position in the sequence $S_0$ of each symbol therein that appears in the sequence $S_1$ at that difference-in-position. Thus, for example, referring to the Pattern Map of FIG. 3 the row index numbered "8" sets forth the symbol(s) that are spaced apart by (that is, have a difference-in-position value of) eight places. The number "13" appearing on that row of the Pattern Map refers to that symbol that appears in the sequence $S_1$ at a distance of eight places from the position of that same symbol in the sequence $S_0$. The identity of the symbol is "S", which is the symbol that occupies the thirteenth position index in the sequence $S_0$. There are three such symbols with a differencein-position of eight. The other symbols are the symbol "P" (at the location corresponding to position index 14 in sequence $S_0$) and the symbol "A" (at the location corresponding to position index 16 in sequence $S_0$). These symbols S, P and A comprise a pattern that occurs at a difference-in-position value of eight. Thus, a pattern of symbols common to the pair-wise combination of sequences $S_0$ and $S_1$ (i.e., the 2-tuple of patterns [0,1]) is "SP•A".

As another example the row index numbered "14" tabulates the three symbols that are spaced apart by (that is, have a difference-in-position value of)
fourteen. The numbers "14", "15" and "17" appearing on that line of the table refers to those symbols that appear in the sequence $S_1$ at a distance of fourteen from the appearance of that same symbol in the sequence $S_0$. By consulting sequence $S_0$ it may be appreciated that:

position index "14" corresponds to symbol "P";
position index "15" corresponds to symbol "P"; and
position index "17" corresponds to symbol "P".

These symbols P, P and P comprise a pattern that occurs at a difference-in-position value of fourteen. Thus, a second patterns of symbols common to the pair-wise combination of sequences $S_0$ and $S_1$ (i.e., the 2-tuple of patterns [0,1]) is "PP•P".

As another example the row index numbered "15" tabulates the three symbols that are spaced apart by (that is, have a difference-in-position value of) fifteen. The numbers "8", "14" and "15" appearing on that line of the table refers to those symbols that appear in the sequence $S_1$ at a distance of fifteen from the appearance of that same symbol in the sequence $S_0$. By consulting sequence $S_0$ it may be appreciated that:

position index "8" corresponds to symbol "G";
position index "14" corresponds to symbol "P"; and
position index "15" corresponds to symbol "P".

These symbols G, P and P comprise a pattern that occurs at a difference-in-position value of fifteen. Thus, a third pattern of symbols common to the pair-wise combination of sequences $S_0$ and $S_1$ (i.e., the 2-tuple of patterns [0,1]) is "G•••••PP".

As still another example the row index numbered "16" tabulates the three symbols that are spaced apart by (that is, have a difference-in-position value of) sixteen. The numbers "14", "15" and "16" appearing on that line of the table refers to those symbols that appear in the sequence $S_1$ at a distance of sixteen from the appearance of that same symbol in the sequence $S_0$. By consulting sequence $S_0$ it may be appreciated that:

position index "14" corresponds to symbol "P";
position index "15" corresponds to symbol "P"; and
position index "16" corresponds to symbol "A".

These symbols P, P and A comprise a pattern that occurs at a difference-in-position value of sixteen. Thus, a fourth pattern of symbols common to the pair-wise combination of sequences $S_0$ and $S_1$ (i.e., the 2-tuple of patterns [0,1]) is "PPA".

As yet another example the row index numbered "17" tabulates the four symbols that are spaced apart by (that is, have a difference-in-position value of) seventeen. The numbers "4", "5", "6" and "14" appearing on that line of the table refers to those symbols that appear in the sequence $S_1$ at a distance of seventeen from the appearance of that same symbol in the sequence $S_0$. By consulting sequence $S_0$ it may be appreciated that:

position index "4" corresponds to symbol "S";
position index "5" corresponds to symbol "P";
position index "6" corresponds to symbol "G"; and
position index "14" corresponds to symbol "P".

These symbols S, P, G and P comprise a pattern that occur at a difference-in-position value of seventeen. Thus, a final patterns of symbols common to the pair-wise combination of sequences $S_0$ and $S_1$ (i.e., the 2-tuple of patterns [0,1]) is "SPG•••••••P".

Summarizing, the patterns SP•A, PP•P, G•••••PP, PPA, and SPG•••••••P are found in both of the sequences $S_0$ and $S_1$, and thus comprise the group of pattern in the 2-tuple [0,1].

In a similar manner the patterns of symbols common to each pair-wise combination of sequences (i.e., the 2-tuples of patterns) may be identified.

With reference to FIG. 4 shown is a Table listing the 2-tuples, the identified patterns of symbols common to all possible pair-wise combinations of sequences $S_0$ through $S_4$.

In FIG. 4 the patterns of symbols found in each 2-tuple are enclosed in a frame. The bracketed listing of numbers (e.g., "[0,1]") in the header of each frame is termed the "tuple identifier". The "tuple identifier" lists the sequence indices of the combination of sequences that produced the patterns. For convenience the number of patterns in the tuple is listed in parenthesis in the header of the frame immediately to the right of the tuple identifier.

For example, the [0,1] 2-tuple contains five patterns of symbols, labeled as "(a)" through "(e)" respectively (as identified above), viz., (a) SP•A;
(b) PP•P;
(c) G•••••PP;
(d) PPA; and
(e) SPG•••••••P.

Similarly, the [0,2] 2-tuple contains two patterns of symbols, labeled as "(f)" through "(g)" respectively, viz., (f) N•••••••••P•E; and
(g) SP•••••••••P.

These patterns, as labeled above, are used in connection with fuller explanations of various aspects of the present invention hereinafter set forth.

The 2-tuples produced by the combination of the sequence $S_0$ with each of the other four sequences are shown across the top row of FIG. 4. These 2-tuples are [0,1], [0,2], [0,3] and [0,4]. Similarly, the 2-tuples produced by the combination of the sequence $S_1$ with each of the remaining three sequences are shown across the second row of FIG. 4. These 2-tuples are [1,2], [1,3] and [1,4]. The 2-tuples produced by the combination of the sequence $S_2$ with the remaining two sequences (i.e., the 2-tuples [2,3] and [2,4]) are shown across the third row of FIG. 4. Finally, the 2-tuple produced by the combination of the sequence $S_3$ with the remaining sequence (i.e., the 2-tuple [3,4] is shown in the bottom row of FIG. 4.

Since patterns occur in combinations of sequences regardless of the order in which the sequences are combined, sequences need be combined only once. Thus, combinations of sequences need appear only once. In the context of FIG. 4, once the sequence $S_0$ is combined with the sequence $S_1$, the sequence $S_1$ need not be combined with the sequence $S_0$ since such a combination will result in the identification of the same patterns. For this reason the combination of the sequence $S_1$ with the sequence $S_0$ does not appear in the second row of FIG. 4.

In general, by convention herein, sequences are combined in ascending sequence index order. The listing of sequences in a tuple identifier in all Figures reflects this convention. By combining sequences in an ascending sequence index order (the second sequence index of a pair-wise combination always being higher than the first sequence index) the identification of redundant patterns at the 2-tuple level is avoided. A convention which pair-wise combines sequences in descending sequence index order could also be used to avoid redundancies.

In any n-tuple one of sequences is selected as a reference sequence. In practice, it is believed convenient to select the sequence having the lower(est) sequence index as the reference sequence. By convention, the first-listed sequence index in the tuple identifier for that combination of sequences designates the selected reference sequence. It should be understood that any other notational convention may be adopted. It should also be understood that any of the sequences in a combination may be selected as the reference sequence.

Position Index Numerical Array The next step in the method in accordance with one embodiment of the invention is the creation of a position index numerical array (herein also referred to by the acronym "PINA") for each identified pattern of symbols. The position index numerical array (PINA) representation of a pattern is an array of numerical values listing the set of position indices, each of which denoting the location in a selected reference sequence at which each symbol in that pattern occurs.

Figure 5:
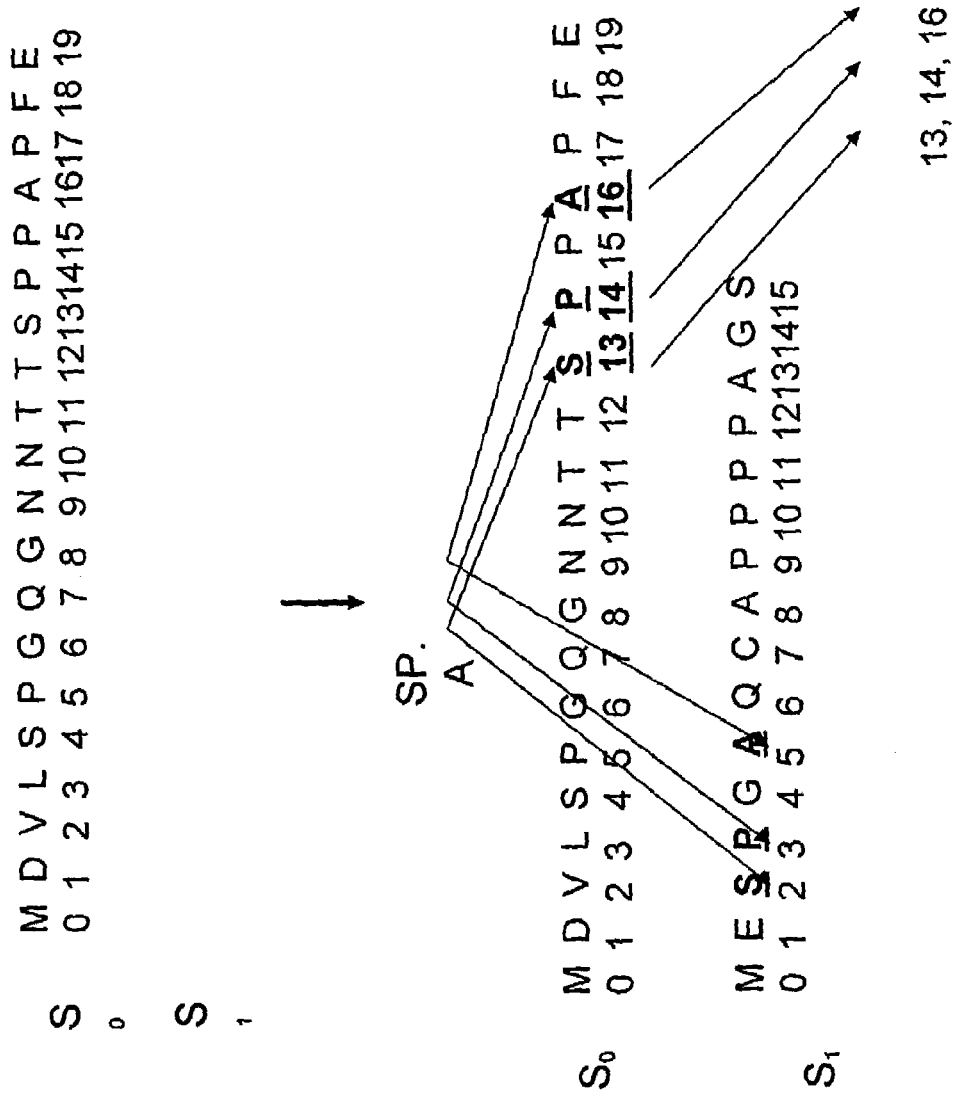
FIG. 5 is a definitional diagram illustrating the creation of a position index numerical array (PINA) representing one identified pattern of symbols in the 2-tuple of sequences $S_0$ and $S_1$ (the [0,1] 2-tuple)

By way of example, FIG. 5 is a definitional diagram illustrating the creation of a position index numerical array (PINA) representing one identified pattern of symbols in the 2-tuple of sequences $S_0$ and $S_1$ (i.e., the [0,1] 2-tuple). For clarity of presentation the sequences $S_0$ and $S_1$ are shown across the upper portion of FIG. 5.

As may be seen from FIG. 4 the pattern "SP•A" is one of the patterns found to be common to both sequences $S_0$ and $S_1$ that form the [0,1] 2-tuple. These symbols of this pattern are highlighted in the replication of each sequence shown in the lower portion of FIG. 5.

With respect to the sequence $S_0$ the symbols in the pattern "SP•A" occur at locations corresponding to position indices 13, 14, and 16, respectively. However, in the sequence $S_1$ the symbols "SP•A" occur at locations corresponding to position indices 2, 3, 5, respectively.

Under the convention adopted herein the sequence $S_0$, having the lower sequence index, is selected as the reference sequence. Accordingly, a position index numerical array (PINA) comprising the set of position indices {13, 14, 16} represents the pattern "SP•A" by denoting the position index in the selected reference sequence (sequence $S_0$) of the 2-tuple at which each respective symbol in that pattern occurs.

Figure 6A:
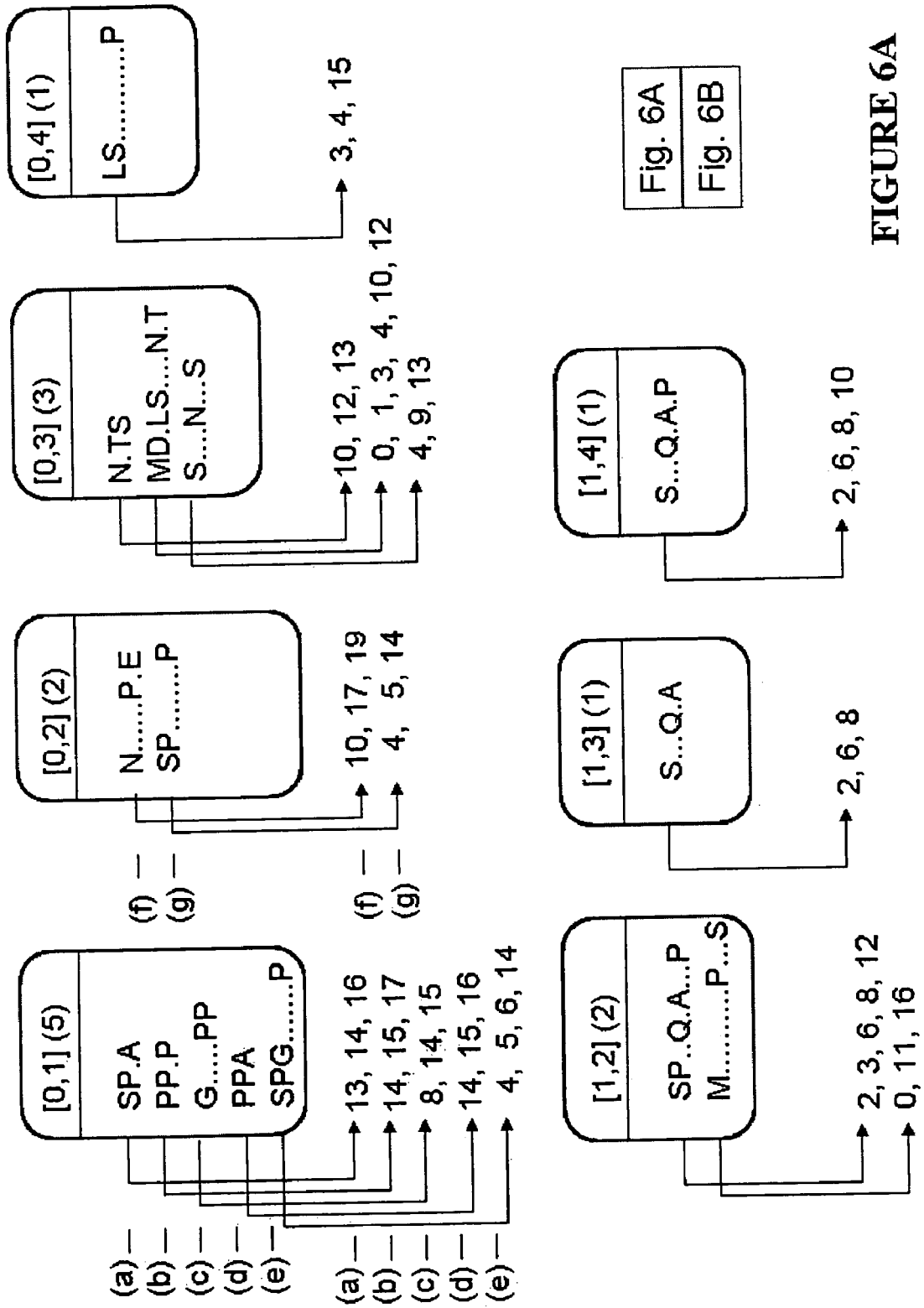
FIGS. 6A and 6B show a correspondence Table illustrating the position index numerical array (PINA) representing each of the identified patterns of symbols tabularized in FIG. 4, the FIGS. 6A and 6B being relatively positioned with respect to each other as indicated in the relational drawing shown in FIG. 6A.
Figure 6B:
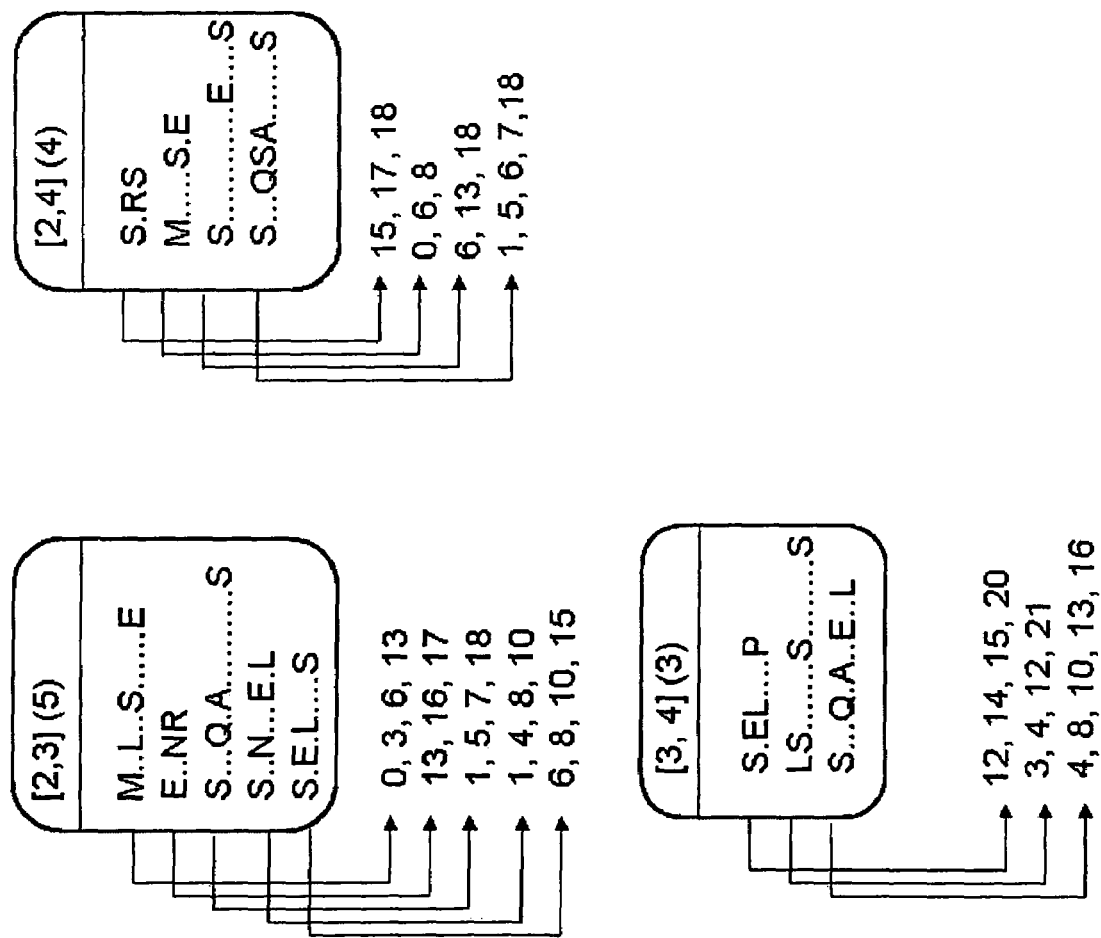

In a similar manner the position index numerical array (PINA) for each pattern produced by each pair-wise combination of sequences may be derived. In FIGS. 6A and 6B the position index numerical arrays (PINAs) are set forth beneath the frame enclosing each 2-tuple to which these position index numerical arrays (PINAs) correspond. Arrows are provided to show more explicitly show the respective correspondences between each pattern and its position index numerical array (PINA).

A pseudo-code program for creating the position index numerical array (PINA) representing a pattern is as follows:

```
parameter: symbol-index tuple T
begin;
   allocate empty destination PINA tuple D;
   allocate empty scratch PINA S;
   for each symbol-index pattern P in T
   {
```

```
      for each symbol-index-pair Y in P
      {
         append Y.index to S;
      }
      copy S to D;
      empty S;
   }
```

Position Index Binary Array Each identified pattern of symbols for a 2-tuple may alternatively be represented in the form of a position index binary array (herein also referred to by the acronym "PIBA"). A position index binary array (PIBA) is a set of binary digits. Each place in the binary array corresponds to a location in the sequence. The binary digit in each place in a position index binary array (PIBA) that corresponds to a location in a selected reference sequence having a symbol in an identified pattern is assigned a first predetermined binary value (e.g., "1"). All other binary digits in the position index binary array (PIBA) are assigned the second predetermined binary value (i.e., "0").

It is apparent that a position index binary array (PIBA) must have a length (i.e., number of places) at least equal to the number of locations in the sequence to which the array corresponds. When two sequences of unequal length are combined to identify patterns the position index binary array (PIBA) used to represent each pattern must have a length at least equal to the length of the reference sequence. It may have a length at least equal to the length of the longer of the sequences in the combination. It may be practical in some implementations to make the length of all position index binary arrays (PIBAs) at least as long as the length of the longest sequence in the set of sequences being considered. Preferably, the length of the position index binary arrays (PIBAs) should be an integral number of word lengths used by the architecture of the computing system implementing the method of the present invention.

Figure 7:
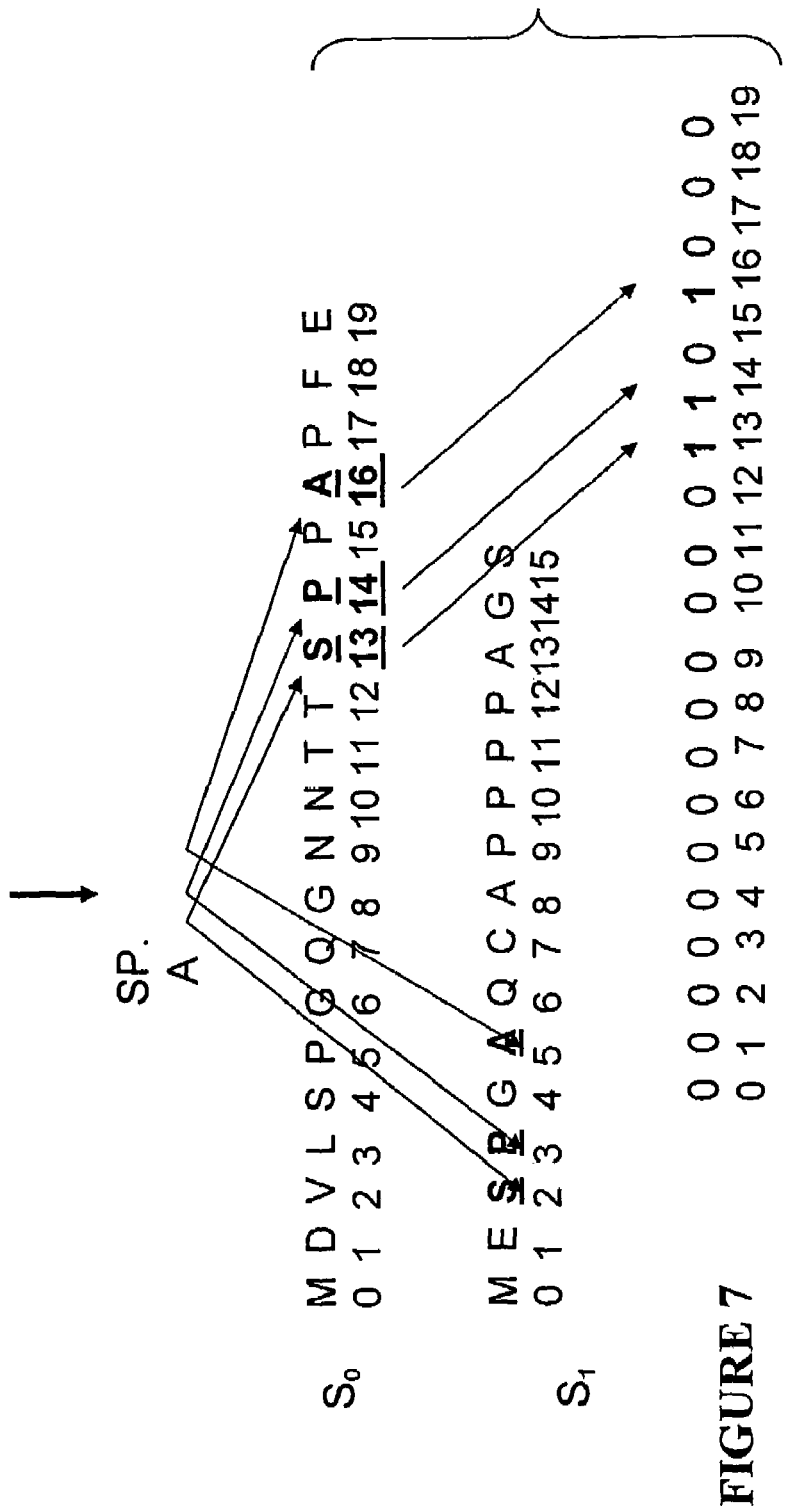
FIG. 7 is a definitional diagram illustrating the creation of a position index binary array (PIBA) representing the same identified pattern of symbols as in FIG. 5 common to the 2-tuple of sequences $S_0$ and $S_1$ (the [0,1] 2-tuple)

FIG. 7 is a definitional diagram illustrating the creation of a position index binary array (PIBA) for the same identified pattern "SP•A" as discussed in connection with FIG. 5. Again, for clarity of presentation, the sequences $S_0$ and $S_1$ are shown in full above the identified pattern. The symbols in the identified pattern are again highlighted in the replication of each sequence shown in the lower portion of FIG. 7.

With respect to the reference sequence $S_0$ it may be seen that the symbols in the pattern "SP•A" occur at locations corresponding to position indices 13, 14, 16, respectively. Accordingly, a position index binary array (PIBA) representing the pattern "SP.A" has a binary digit with the value "1" in the places in the position index binary array (PIBA) corresponding to the position indices 13, 14, 16, respectively.

Figure 8A:
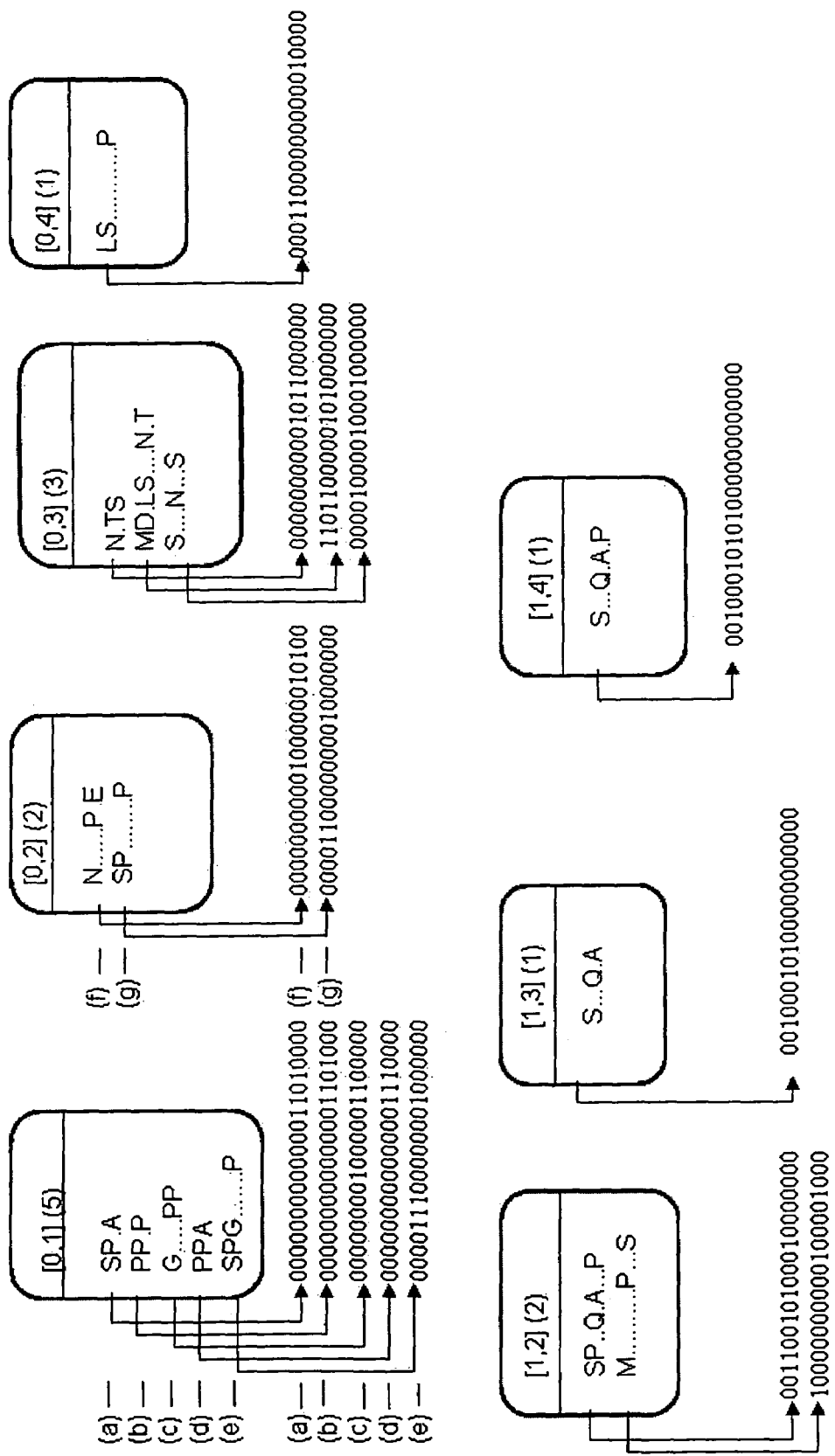
FIGS. 8A and 8B show a correspondence Table illustrating the position index binary array (PIBA) representing each identified pattern of symbols tabularized in FIG. 4, the FIGS. 8A and 8B being relatively positioned with respect to each other as indicated in the relational drawing shown in FIG. 8A.
Figure 8B:
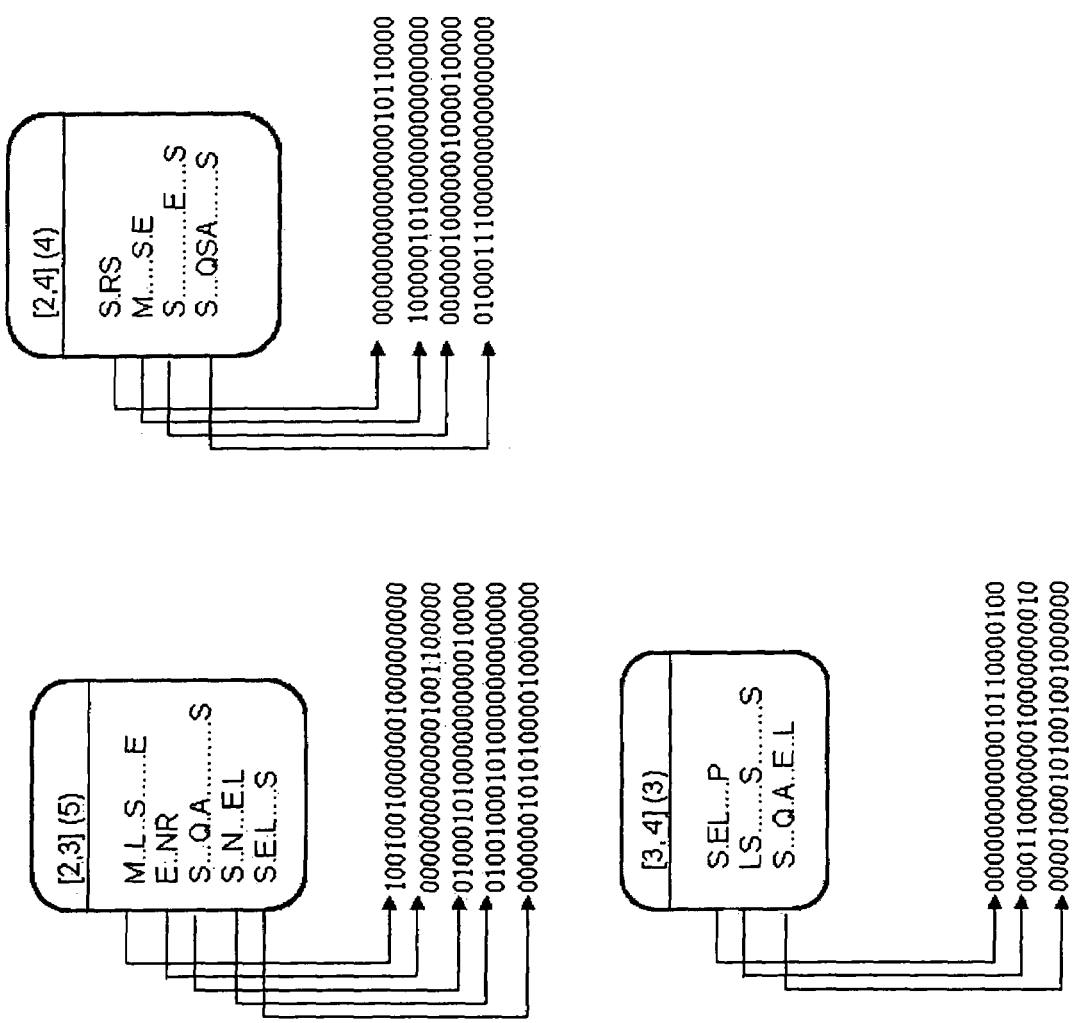

In FIGS. 8A and 8B the position index numerical binary arrays (PIBAs) are set forth beneath the frame enclosing each 2-tuple to which these arrays correspond. Arrows again are used to show more explicitly the respective correspondences between each pattern and its position index binary array (PIBA) representation.

A pseudo-code program for creating a position index numerical array (PIBA) representing a pattern is as follows:

```
parameters: symbol-index tuple T, length of
   PIBAs L
begin;
   allocate empty destination PIBA tuple D;
```

-continued

```
allocate empty scratch PIBA S;
for each symbol-index pattern P in T
{
  for each bit S_i in S
  {
    S_i = 0;
  }
  for each symbol-index-pair Y in P
  {
    S_{Y.index} = 1;
  }
  copy S to D;
  empty S;
}
```

-o-0-o-

Creating 3-Tuples of Patterns The next step of the method of the present invention is to take pair-wise combinations of all 2-tuples that share a common reference sequence to identify patterns of symbols in the resulting 3-tuples.

Figure 9A:
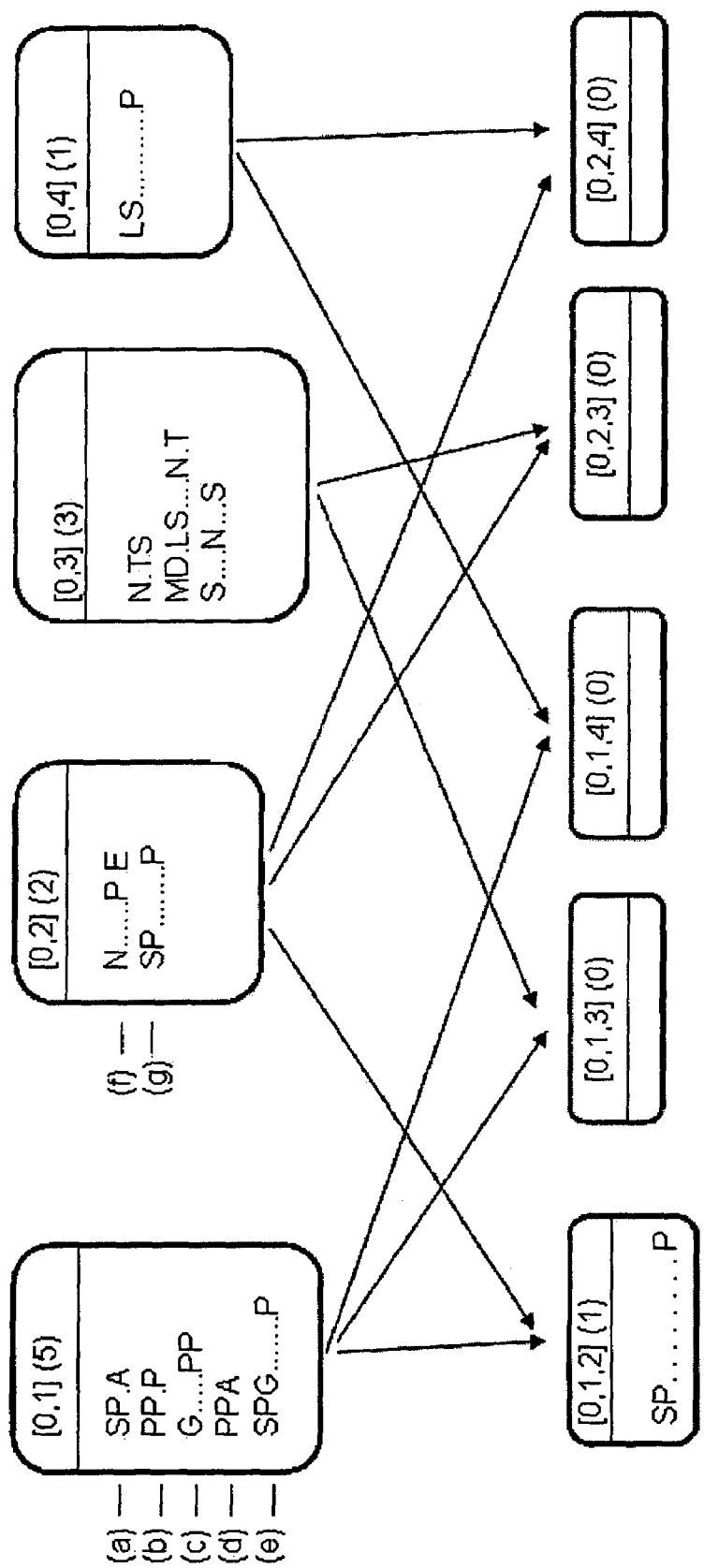
FIGS. 9A and 9B set forth the patterns of symbols in 3-tuples created by the pair-wise combination of all 2-tuples that share a common reference sequence, the FIGS. 9A and 9B being relatively positioned with respect to each other as indicated in the relational drawing shown in FIG. 9A.
Figure 9B:
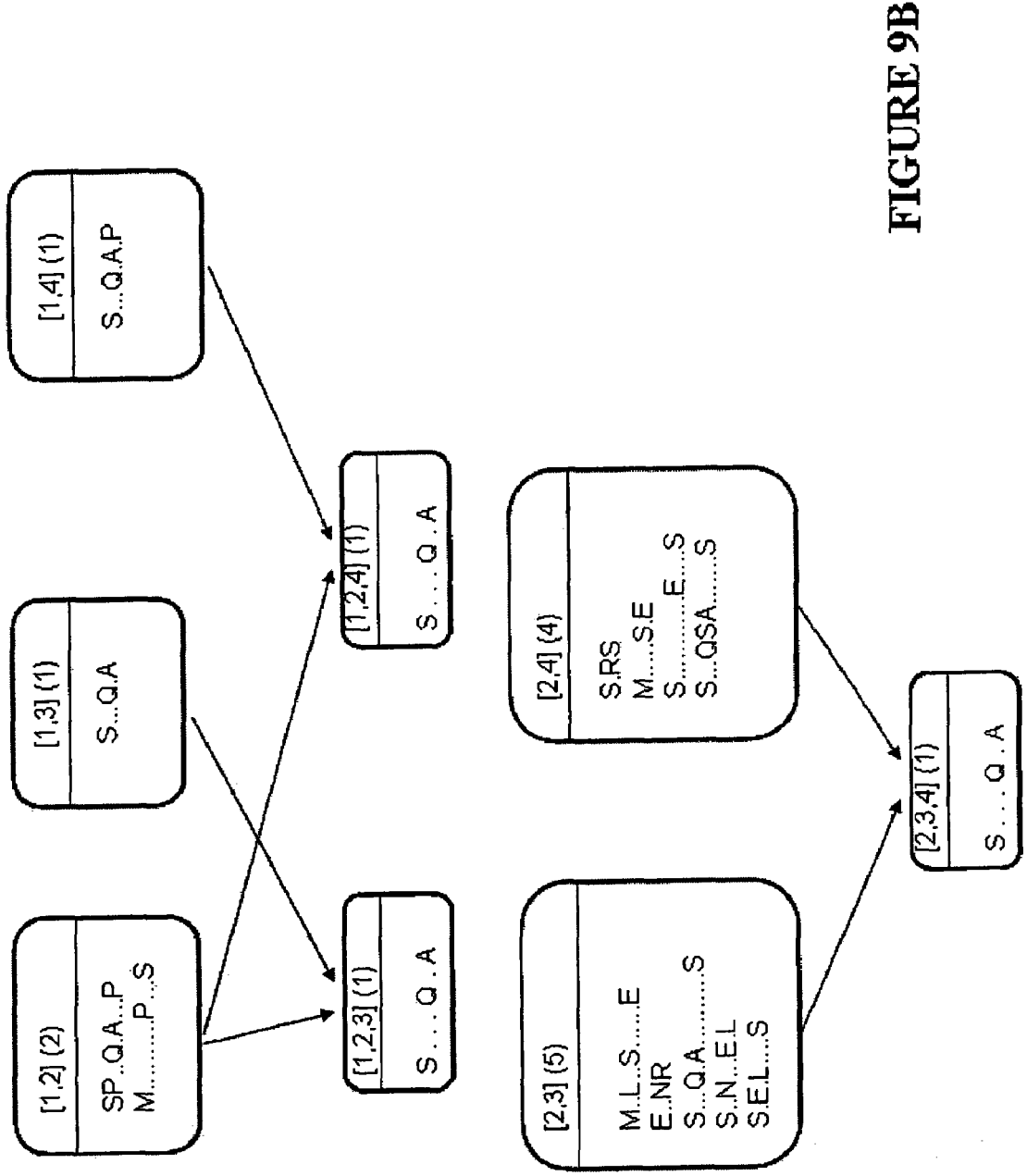

FIGS. 9A and 9B show all the patterns of symbols in the resulting 3-tuples so created. For example, the [0,1] and the [0,2] 2-tuples are combined to produce a [0,1,2] 3-tuple (FIG. 9A). This 3-tuple contains the pattern "SP•••••••P". Similarly, as seen in FIG. 9B, the [1,2] 2-tuple when combined with the [1,3] 2-tuple produce the [1,2,3] 3-tuple containing the pattern "S•••Q•A". The combination of the [1,2] 2-tuple and the [1,4] 2-tuple produces the [1,2,4] 3-tuple that also happens to contain the pattern "S•••Q•A". The [2,3] 2-tuple and the [2,4] 2-tuple combine to produce the [2,3,4] 3-tuple. This 3-tuple again happens to contain the pattern "S•••Q•A".

As is depicted in FIG. 9A, when combined in a similar manner the 3-tuples produced by the pair-wise combination of the 2-tuples [0,1] and [0,3]; [0,1] and [0,4]; [0,2] and [0,3]; and [0,3] and [0,4] do not contain any patterns of symbols. These resulting 3-tuples are accordingly termed "empty 3-tuples". (The number of patterns is listed in parenthesis in the header of the frame is zero.)

Figure 13A:
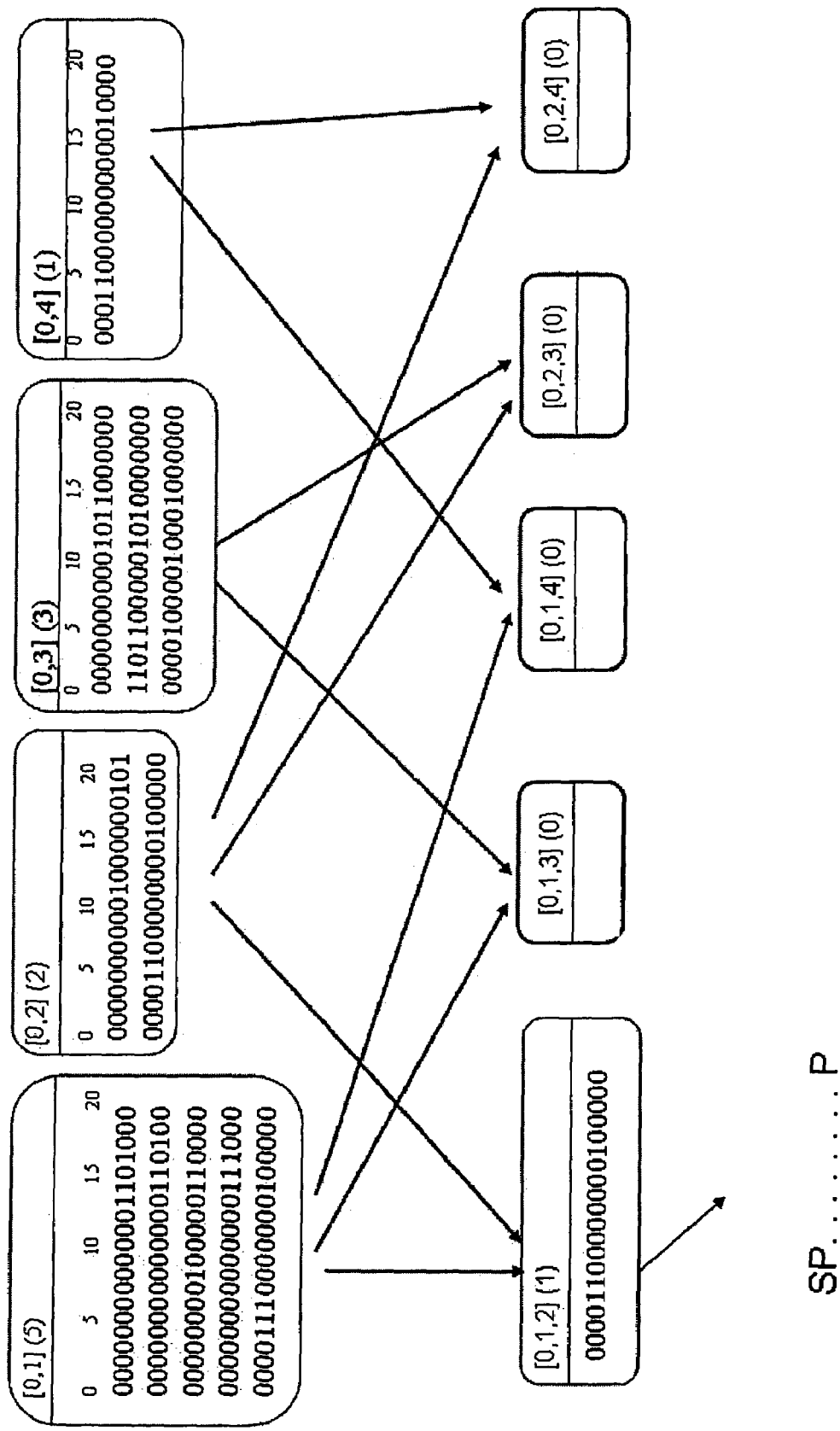
FIGS. 13A and 13B illustrate the position index binary array (PIBA) representations of all 2-tuples that share a common reference sequence as well as all 3-tuples created by the pair-wise combinations of these 2-tuples intersected in the manner shown in FIG. 12, the FIGS. 13A and 13B being relatively positioned with respect to each other as indicated in the relational drawing shown in FIG. 13A.
Figure 13B:
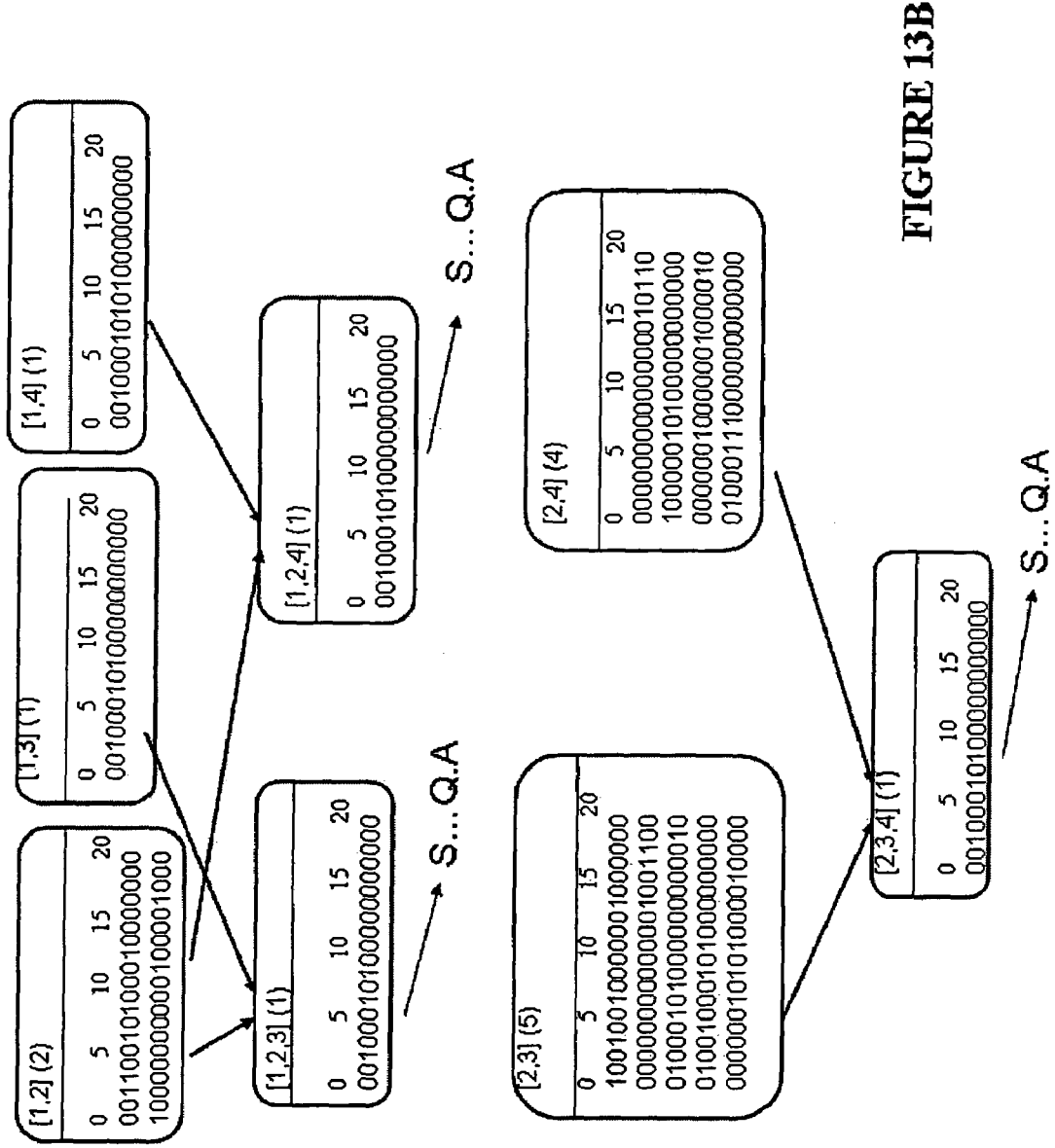
Figure 14:
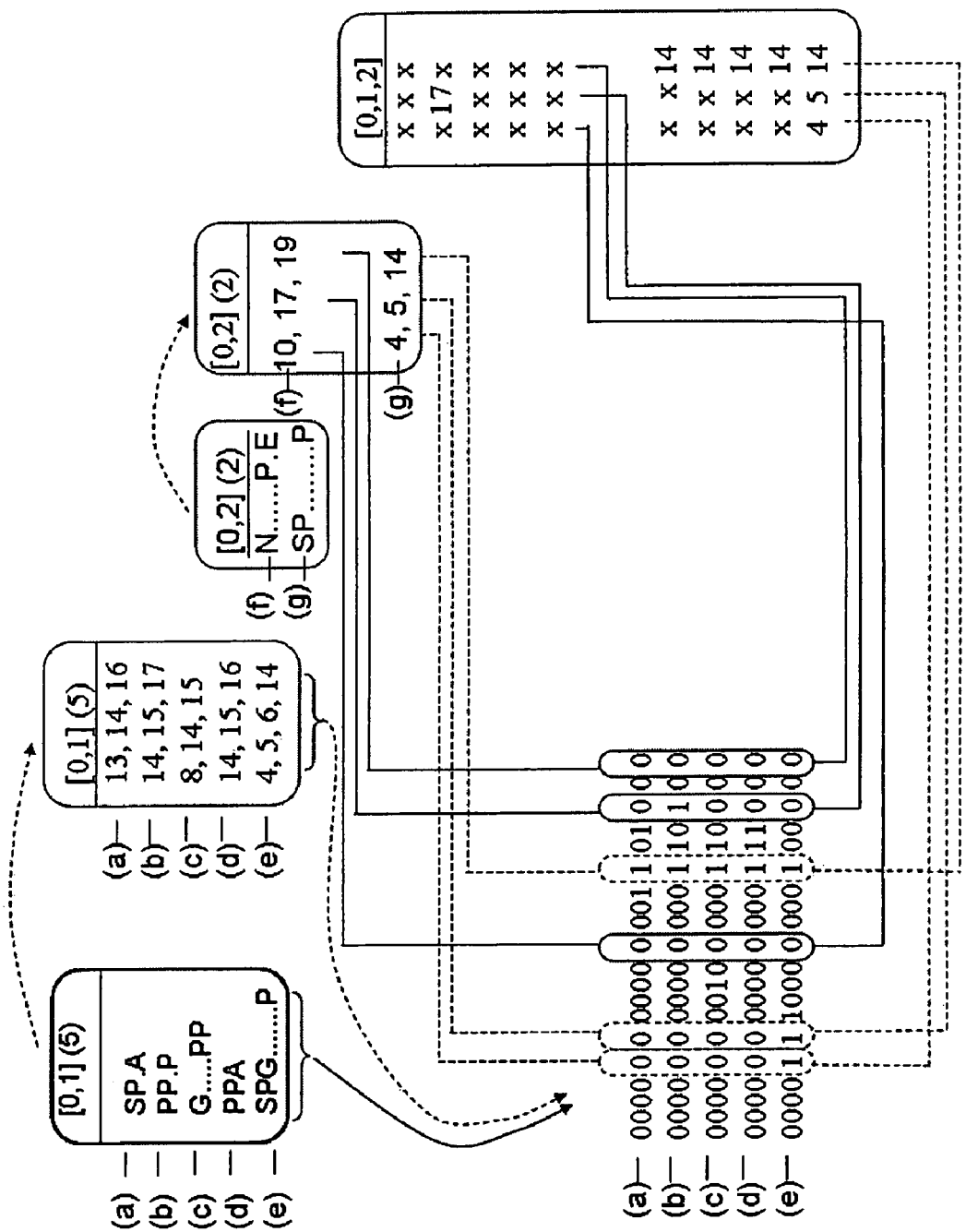
FIG. 14 illustrates a hybrid method of combining the same patterns in the [0,1] and [0,2] 2-tuples as in FIGS. 10 and 12 using the position index binary array (PIBA) representation of the patterns in one of the 2-tuples assembled in "scoreboard" fashion and the position index numerical array (PINA) representations of the patterns in the other 2-tuple to identify a pattern in the same exemplified 3-tuple of patterns.

In accordance with the present invention 2-tuples may be pair-wise combined using either the position index numerical array (PINA) representation of patterns (FIGS. 10, 11A, 11B), the position index binary array (PIBA) representation of patterns (FIGS. 12, 13A, 13B), or a hybrid combination of position index numerical array representations taken with position index binary array representations (FIG. 14).

When using position index numerical arrays (PINAs) patterns are identified from the position index numerical arrays (PINAs) produced by the intersection of the set of position indices in each position index numerical array (PINA) in one 2-tuple with the set of position indices in each position index numerical array (PINA) in the other 2-tuple. Each position index numerical array (PINA) so defined represents a pattern in a 3-tuple of patterns.

Figure 10:
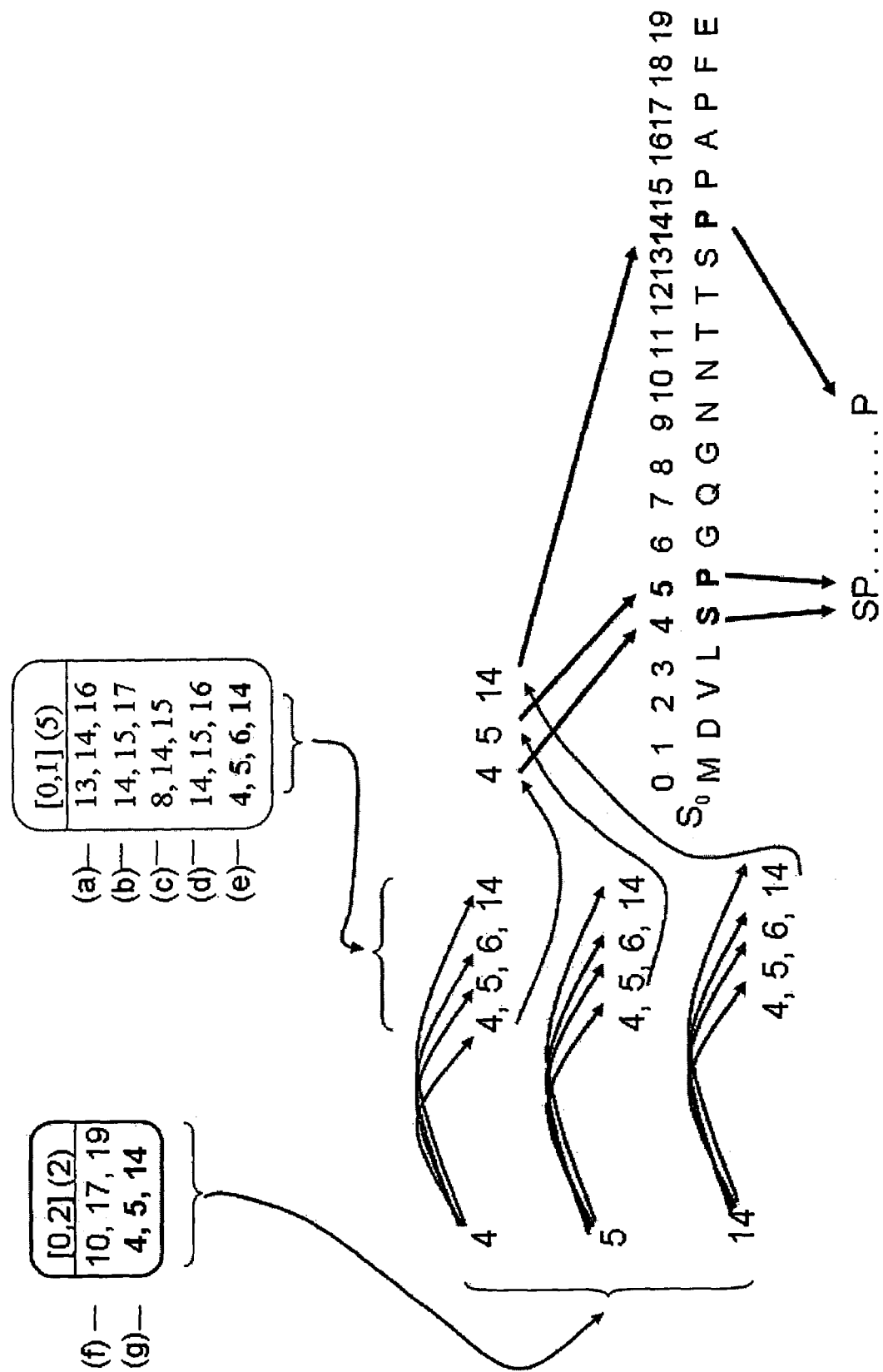
FIG. 10 illustrates the use of two position index numerical arrays (PINAs), each representing a respective pattern in the [0,1] and [0,2] 2-tuples, to identify a pattern in an exemplified 3-tuple of patterns (the [0,1,2] 3-tuple) produced from the pair-wise combination of those 2-tuples.

FIG. 10 illustrates the manner in which two position index numerical array (PINA) representations of respective patterns in the [0,1] and [0,2] 2-tuples are combined pair-wise to identify a pattern in the [0,1,2] 3-tuple.

As shown in FIG. 10 the position index numerical array containing the set of position indices {4, 5, 6, 14} represents pattern (e) in the [0,1] 2-tuple ("SPG•••••••P"). The position index numerical array (PINA) containing the set of position indices {4, 5, 14} represents pattern (g) in the [0,1] 2-tuple ("SP•••••••P").

These sets of position indices are intersected by sequentially comparing each position index of one position index numerical array (PINA) with each of the position indices of the other position index numerical array (PINA).

As specifically depicted in FIG. 10, the first position index in pattern (g) (here, "4") is compared with each of the indices of pattern (e) (here, 4, 5, 6, and 14). When this comparison results in an index match, that matching index (here, "4"), is stored.

Next, the second position index in pattern (g) (here, "5") is compared with each of the indices (4, 5, 6, and 14) of pattern (e). Again, a matching index resulting from this comparison (here, "5") is stored.

Finally, the third position index in pattern (g) (here, "14") is compared with each of the indices (4, 5, 6, and 14) of pattern (e). The resulting matching index ("14") is stored.

The set of stored matching position indices {4, 5, 14} collectively defines a position index numerical array (PINA) representing a identified pattern in the [0,1,2] 3-tuple. The position index numerical array (PINA) representing the identified pattern is converted into the corresponding symbols by mapping the indices ("4, 5. 6") in the array to the respective symbols in the reference sequence $S_0$. The identified pattern of symbols is "SP•••••••P".

Figure 11A:
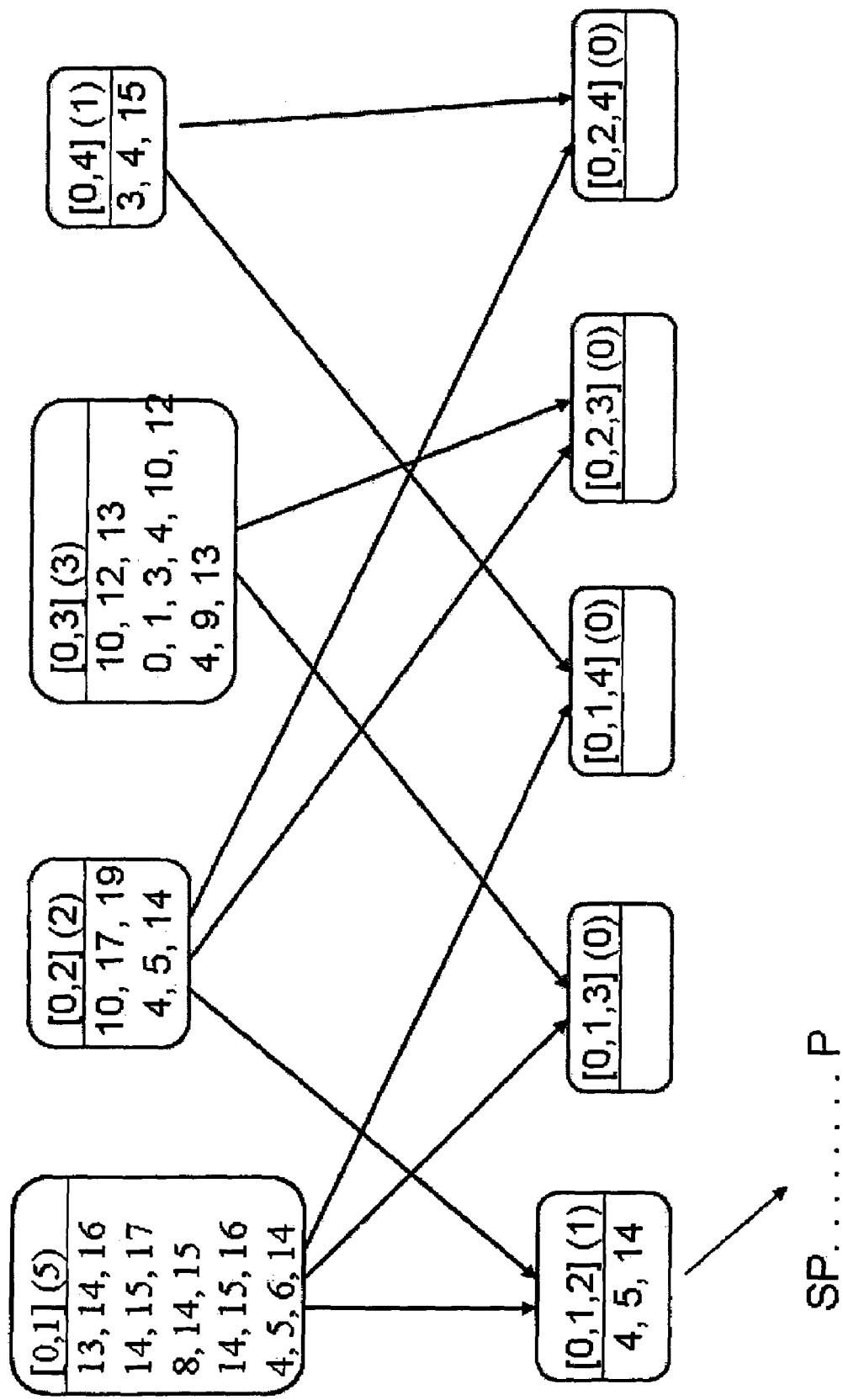
FIGS. 11A and 11B illustrate the position index numerical array (PINA) representations of all 2-tuples that share a common reference sequence as well as all 3-tuples created by the pair-wise combinations of these 2-tuples intersected in the manner shown in FIG. 10, the FIGS. 11A and 11B being relatively positioned with respect to each other as indicated in the relational drawing shown in FIG. 11A.
Figure 11B:
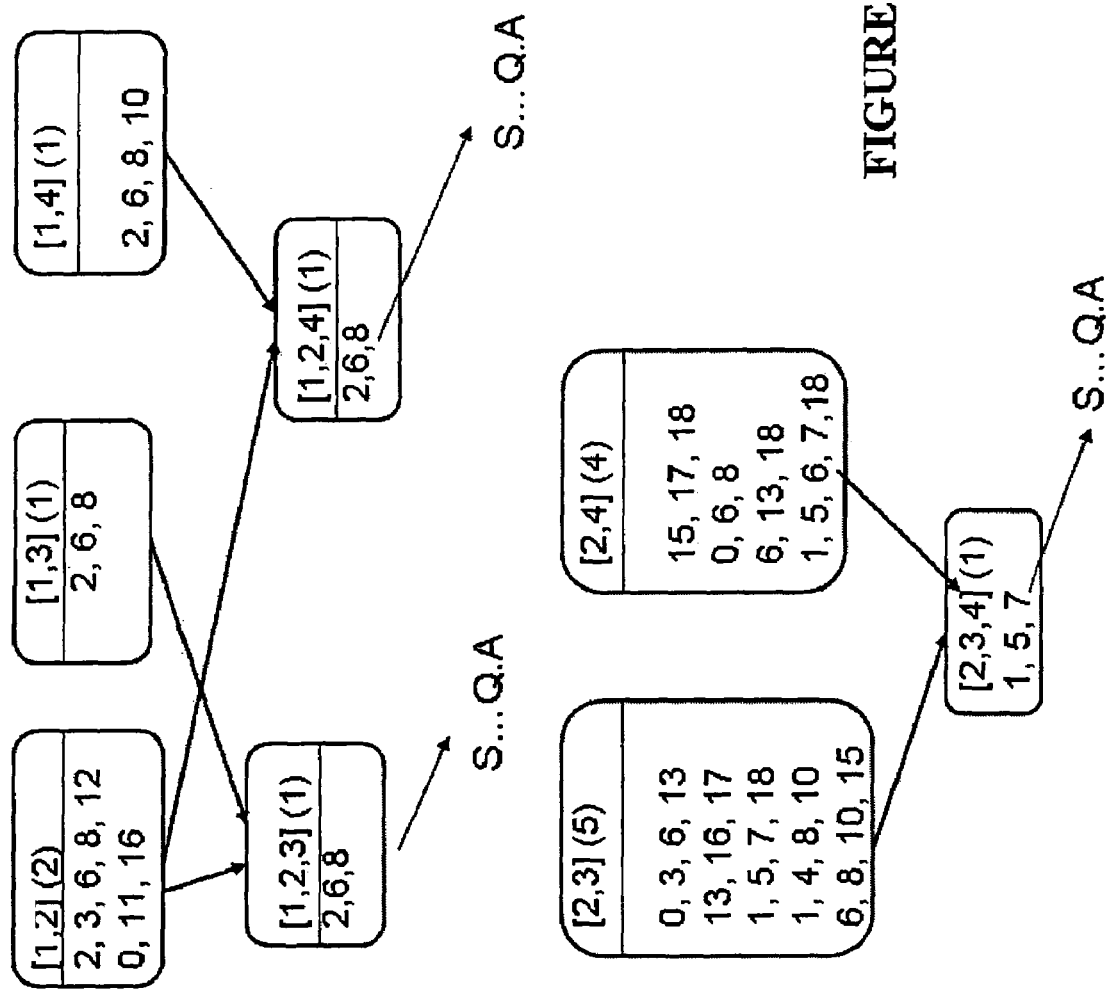

FIGS. 11A and 11B illustrate the position index numerical array (PINA) representations of all 2-tuples that share a common reference sequence as well as all 3-tuples created by the pair-wise combinations of these 2-tuples intersected in the manner shown in FIG. 10. The patterns of symbols in the 3-tuples are also indicated in FIGS. 11A and 11B.

A pseudo-code program for creating the intersection of the set position indices of one position index numerical array (PINA) with the set position indices of another position index numerical array (PINA) is as follows:

```
parameters: PINA tuple T, PINA tuple U
begin;
determine length L of longest pattern in T;
allocate empty destination PINA tuple D;
allocate empty scratch PINA S;
for each pattern P in T
{
  for each pattern Q in U
  {
    for each numeric index M in Q
    {
      if (M appears in P) append M to S;
    }
    if (S is non-empty)
    {
      copy S into D;
      empty S;
    }
  }
}
```

Figure 12:
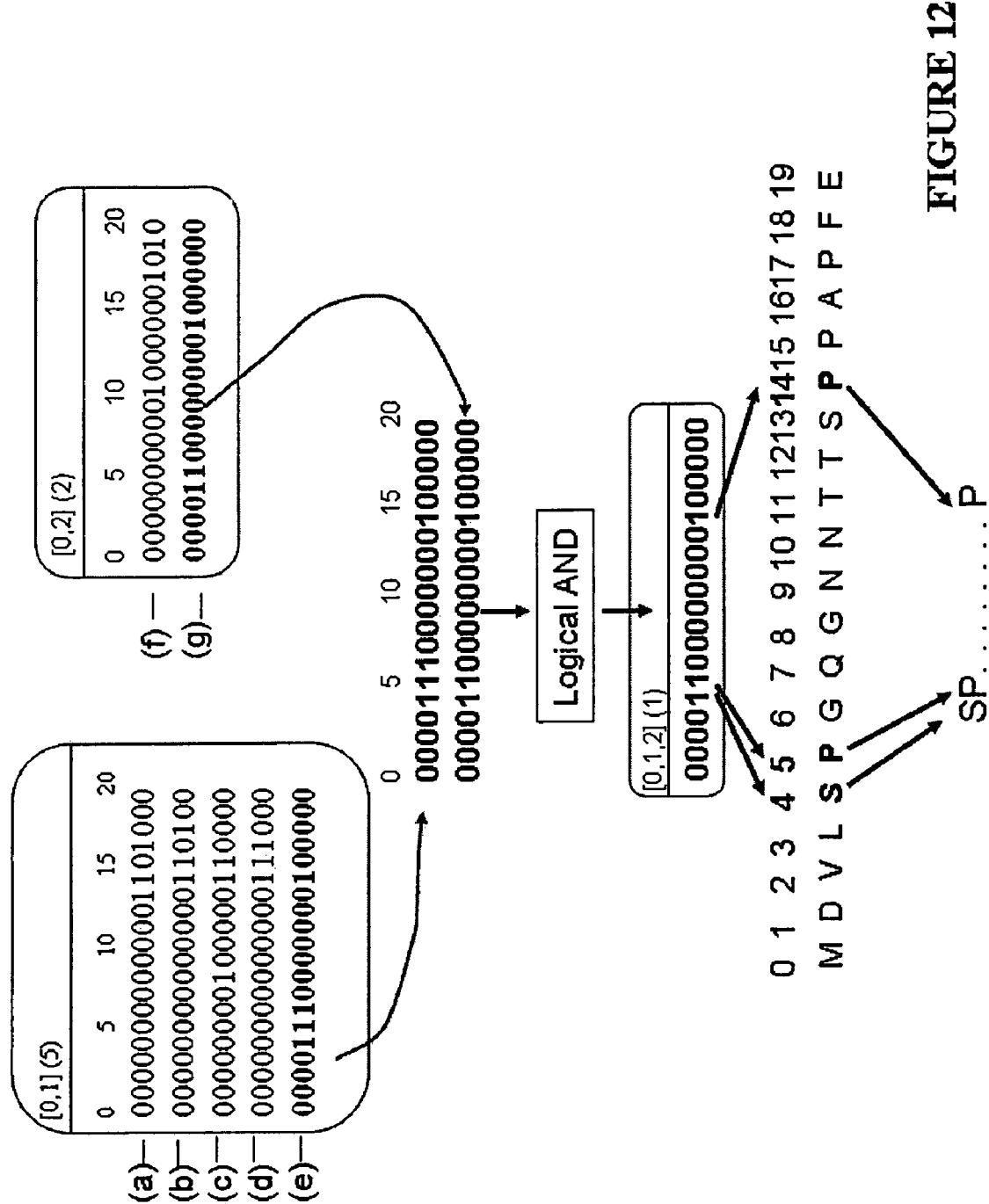
FIG. 12 illustrates the use of two position index binary arrays (PIBA's), each again representing the same respective pattern in the [0,1] and [0,2] 2-tuples as in FIG. 10, to identify a pattern in the same exemplified 3-tuple of patterns (the [0,1,2] 3-tuple) produced from the pair-wise combination of those 2-tuples.

As previously noted 2-tuples may be pair-wise combined using the position index binary array (PIBA) representation of patterns. FIG. 12 illustrates the manner in which two position index binary array (PIBA) representations of the same respective patterns in the [0,1] and [0,2] 2-tuples as are discussed in connection with FIG. 10 are combined pair-wise to identify a pattern in the [0,1,2] 3-tuple.

The sequence $S_0$ has twenty symbols located in position indices 0 through 19. The sequence $S_1$ has sixteen symbols located in position indices 0 through 15. The sequence $S_2$ contains nineteen symbols located in position indices 0 through 18.

Since sequence $S_0$ is the reference sequence the length of the position index binary array (PIBA) representations for patterns in these 2-tuples is determined by the length of the reference sequence $S_0$.

As shown in FIG. 12 the position index binary array representations of the patterns in the [0,1] and [0,2] 2-tuples are sets of binary digits that are twenty places in length (numbered 0 through 19) (as determined by the length of the reference sequence $S_0$).

By way of example, the position index binary array (PIBA) representation of the pattern (e) in the [0,1] 2-tuple is: 00001110000000100000.

The position index binary array (PIBA) representation of the pattern (g) in the [0,2] 2-tuple is: 00001100000000100000.

To define the position index binary array (PIBA) that represents a patterns in a 3-tuple the set of binary digits of the position index binary array (PIBA) of the pattern (e) from one 2-tuple is intersected with the set of binary digits of the position index binary array (PIBA) of the pattern (g) from the other 2-tuple. The intersection is accomplished by performing a logical AND operation in a bit-by-bit manner on the position index binary arrays (PIBAs).

The position index binary array (PIBA) representation of the pattern produced by the logical AND operation is used to identify the common pattern. Using the places in the position index binary array (PIBA) produced by the intersection having the first predetermined binary value as a guide, the symbols in corresponding locations in the reference sequence are identified. These symbols comprises the symbols in the identified pattern in the 3-tuple.

Performing the same logical operation using each of the position index binary arrays (PIBA) in one 2-tuple with each position index binary array (PIBA) in the other 2-tuple yields the position index binary arrays (PIBAs) of all patterns in the 3-tuple. The position index binary arrays (PIBAs) and the common patterns represented thereby for all 3-tuples are shown in FIGS. 13A and 13B.

It is noted that, as implemented in the discussed example the binary value "1" has been used to represent symbols in a pattern and the logical operation used to perform the intersection is the logical AND function. It should understood that alternative representations of symbols in a pattern and complementary logical operations may also be used and remain within the contemplation of the present invention.

A pseudo-code program for creating the intersection the set position indices of one position index binary array (PIBA) with the set position indices of another position index binary array (PIBA) is as follows:

```
parameters: PIBA tuple T, PIBA tuple U,
length of PIBAs L
begin;
allocate empty destination PIBA tuple D;
allocate empty scratch PIBA S of length L;
for each pattern P in T
{
  for each pattern Q in U
  {
    S = P bitwise-logical-AND Q;
    if (any bit S_i in S is 1)
    {
      copy S into D;
    }
  }
}
```

Alternatively, the set of position indices of position index numerical array (PINA) representations of patterns from one 2-tuple may be intersected with the set of position indices of the position index numerical arrays (PINAs) of the patterns from the other 2-tuple by first converting the position index numerical array (PINA) to corresponding position index binary array (PIBA) representations and logically ANDing the same.

The resultant position index binary array (PIBA) representations are converted back to the position index numerical array (PINA) representations.

A n pseudo-code program for implementing this alternative intersection is as follows:

```
parameters: PINA tuple T, PINA tuple U
begin;
determine length L of longest pattern in T and U;
allocate bit arrays B and C of length L;
allocate scratch bit array S of length L;
allocate empty scratch PINA P;
allocate empty destination PINA tuple D;
for each bit B_i in B
{
  B_i = 0;
}
for each bit C_i in C
{
  C_i = 0;
}
for each pattern P in T
{
  for each numeric index N in P
  {
    B_N = 1;
  }
  for each pattern Q in U
  {
    for each numeric index M in Q
    {
      C_M = 1;
    }
    S = B bitwise-logical-AND C;
    if (any bit S_i in S is 1)
    {
      for each bit S_i in S
      {
        if(S_i is 1) append i to P;
      }
      copy P to D;
      empty P;
    }
  }
}
```

-o-0-o-

The identification of common patterns in 3-tuples may be performed by a hybrid operation that uses the position index numerical array (PINA) representations of the patterns in one 2-tuple taken with the position index binary array (PIBA) representations of the patterns in the other 2-tuple. This implementation is illustrated in FIG. 14.

In FIG. 14, in the preferred case, the position index binary array (PIBA) representations of patterns labeled (a) through (e) of the [0,1] tuple are created using the techniques discussed in connection with FIG. 7.

These position index binary array (PIBA) representations are assembled in a rectangular array resembling a "scoreboard". The rows of the scoreboard respectively contain the position index binary array representations of the patterns (a) thorough (e). The columns of the scoreboard identify the places within the position index binary arrays (PIBAs).

For the [0,2] 2-tuple the position index numerical array (PINA) representations of patterns (f) and (g) are created in accordance with the techniques shown in FIG. 5.

Each position index in each position index numerical array (PINA) in the [0,2] 2-tuple is used to interrogate the places in the position index binary arrays (PIBAs) of the [0,1] 2-tuple. The interrogation is designed to identify the places in each position index binary array (PIBA) in the [0,1] 2-tuple that have the first predetermined binary value (i.e., "1"). These operations are illustrated in FIG. 14.

The pattern (f) is the first pattern in the [0,2] 2-tuple. This position index numerical array (PINA) for pattern (f) contains the numerical position indices 10, 17 and 19.

As shown by the solid line from numeric position index value "10" in the pattern (f), the tenth places in the position index binary arrays (PIBAs) (shown enclosed by the solid oval) are interrogated. It can be seen that none of the binary digits in that tenth place of any of the position index binary arrays (PIBAs) contain the predetermined binary value (i.e., a "1").

The next position index in the position index numerical array (PINA) for pattern (f) (a value "17") is next taken as the interrogator. The solid line from numeric index "17" terminates in a solid oval enclosing the seventeenth places in the scoreboard of the position index binary arrays (PIBAs). This interrogation identifies the fact that the predetermined binary value "1" is present in the seventeenth place in the position index binary array (PIBA) for pattern (b).

Similarly, the last position index in the position index numerical array (PINA) for pattern (f) (a value "19") is next taken as the interrogator. The solid line from the numeric index "19" terminates in a solid oval enclosing the nineteenth places in the scoreboard of the position index binary arrays (PIBAs). None of the binary digits in the nineteenth places of any of the position index binary arrays (PIBAs) in the scoreboard contain a binary "1".

The interrogation by the position indices in the position index numerical array (PINA) for pattern (f) results in an output numeric array containing the only value "17", the place in the position index binary arrays of the [0,1] 2-tuple that contain the binary value "1". No patterns (i.e., two or more symbols) are identified by this interrogation.

The second pattern in the [0,2] 2-tuple, i.e., the position index numerical array (PINA) for the pattern labeled (g) is considered next. This position index numerical array (PINA) for pattern (g) contains the numerical position indices 4, 5 and 14.

As shown by the dashed line from the first numeric position index value "4" in the position index numerical array (PINA) for the pattern (g), the places in the position index binary arrays (PIBAs) shown enclosed by the dashed oval are interrogated. This interrogation reveals that the predetermined binary value "1" is present only in the place corresponding to the position index "4" in the position index binary array (PIBA) for pattern (e).

The next position index in the position index numerical array (PINA) for the pattern (g) (a value "5") is next taken as the interrogator. The dashed line from numeric index "5" terminates in a dashed oval enclosing the illustrated places in the position index binary arrays (PIBAs). The predetermined binary value "1" is also only found only in the place corresponding to the position index "5" in the position index binary array (e).

The value "14" is the last position index in the position index numerical array (PINA) for the pattern (g). This value is next taken as the interrogator. The dashed line from this numeric index "14" terminates in a dashed oval enclosing the corresponding places in the position index binary arrays (PIBAs). The predetermined binary value "1" is again only found only in the place corresponding to the position index "14" in the position index binary array (e).

The interrogation by the position indices of the position index numerical array (PINA) for the pattern (g) is seen to produce five output numeric arrays respectively containing the values "14"; "14"; "14"; "14"; and "4, 5, 14". Thus, the interrogation by the indices in the second pattern of the [0,2] 2-tuple identifies only the pattern represented by the position indices "4, 5. 6" as being present in the 3-tuple.

The identifies of those places in scoreboard of position index binary arrays (PIBA's) having the first predetermined binary value may be used to define one or more position index numerical arrays (PINAs) that each represent a pattern in a 3-tuple of patterns. The position index numerical arrays (PINAs) of the patterns in the 3-tuple of patterns defined in step (d) are then converted into the symbols represented thereby in the same manner as shown in FIG. 10. The corresponding pattern is again identified as "SP••••••••P".

A pseudo-code program for creating the "scoreboard" method is as follows:

```
parameters: PINA tuple T, PINA tuple U
begin;
    determine length L of longest pattern in T;
    allocate bit array B of length L;
    allocate empty destination PINA tuple D;
    allocate empty scratch PINA S;
    for each bit B_i in B
    {
        B_i = 0;
    }
    for each pattern P in T
    {
        for each numeric index N in P
        {
            B_N = 1;
        }
        for each pattern Q in U
        {
            for each numeric index M in Q
            {
                if (B_M is 1) append M to S;
            }
            if (S is non-empty)
            {
                copy S into D;
                empty S;
            }
        }
        for each numeric index N in P
        {
            B_N = 0;
        }
    }
```

Alternatively, the pattern of symbols in the reference sequence $S_0$ at the locations "4, 5. 6" (corresponding to the identified places in the scoreboard of position index binary arrays (PIBA's) having the first predetermined binary value) is directly identified in the same manner as shown in FIG. 12. The corresponding pattern is, therefore, "SP••••••••P".

The "scoreboard" of binary array representations may be indirectly assembled by first creating the position index numerical array (PINA) representations of the patterns of the [0,1] 2-tuple using the techniques discussed in connection with FIG. 5. These numerical array representations are then converted into their corresponding binary array representations which are used in the "scoreboard". This conversion is accomplished using the same techniques as shown in the braced portion of FIG. 7.

-o-0-o-

The principles of the present invention hereinbefore set forth and used to illustrate the combination of 2-tuples sharing a common reference sequence to produce a 3-tuple may be readily extended to situations involving greater numbers of sequences than heretofore described (i.e., situations where k is greater than four) and combinations of still higher order n-tuples sharing a common reference sequence than heretofore described, i.e., "n" has any value up to (k−1).

Figure 15:
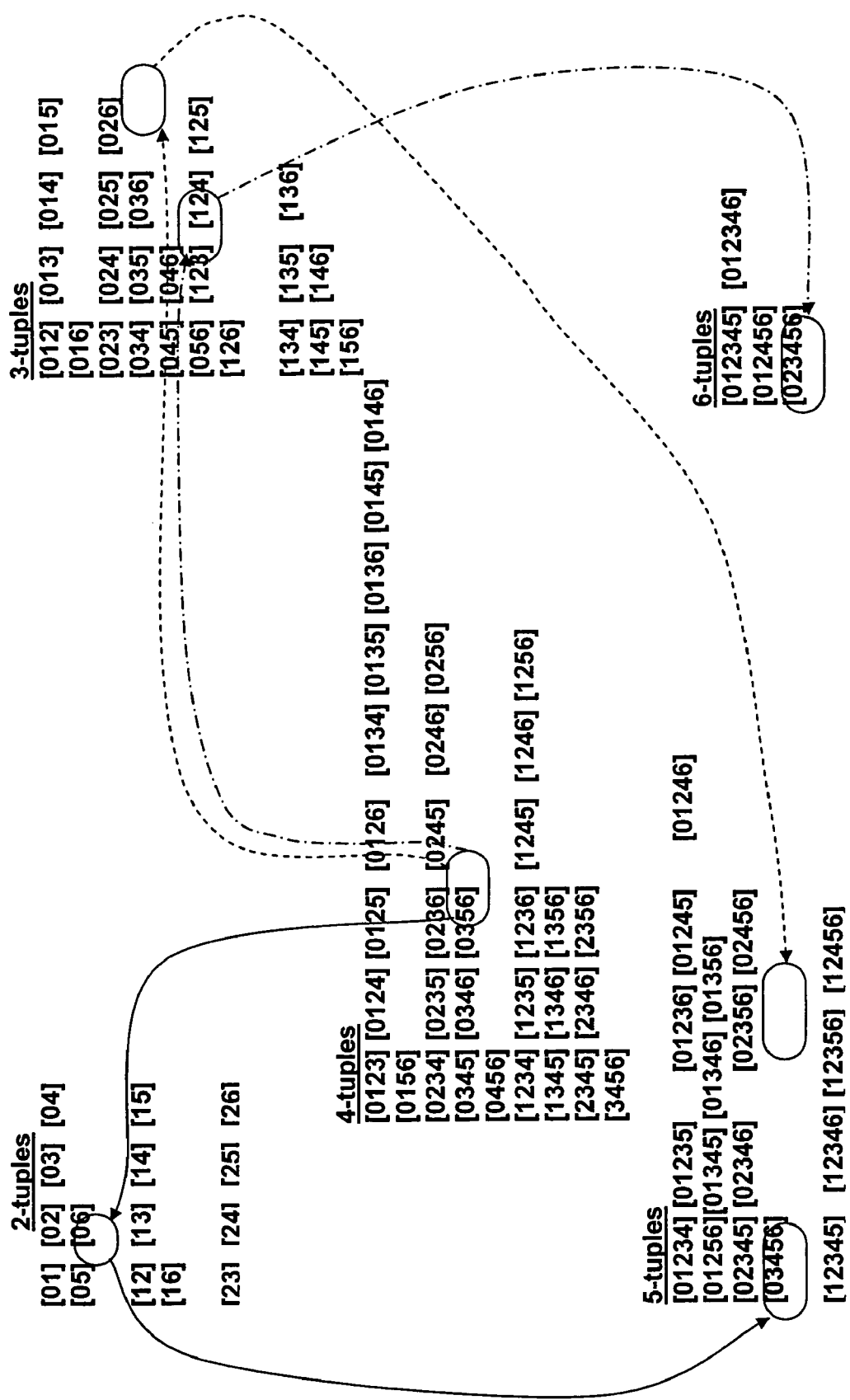
FIG. 15 is a Table listing the tuple identifiers of all possible tuples in each n-tuple from n=2 to n=6 from which the extension of the principles of the present invention may be better understood.

The extension of these principles may be better understood from FIG. 15 which is a Table grouping the tuple identifiers of all possible tuples in each order of n-tuples from n=2 to n=6 produced from seven sequences of symbols having sequence indices 0, 1, 2, 3, 4, 5, and 6. Each n-tuple is identifiable by the sequence indices of the n-sequences contained within that n-tuple as appearing in the tuple identifier. For brevity of notation the commas in the tuple identifiers are omitted.

In general, tuples at any order "n" that share a common reference sequence may be pair-wise combined. Such pair-wise combinations may be effected using either: (i) the position index numerical array (PINA) representations of patterns as fully discussed in connection with FIGS. 10, 11A, 11B; (ii) the position index binary array (PIBA) representations of patterns as fully discussed in connection with FIGS. 12, 13A, 13B; or (iii) the hybrid method using position index binary array representations of one tuple taken with the position index numerical array representations of the other tuple, as fully discussed in connection with FIG. 14.

The pattern representations of each tuple at any order "n" may be combined with the pattern representations of all other tuples at that order sharing a common reference sequence, provided patterns exist in each n-tuple.

Consider the grouping of 4-tuples. Each 4-tuple (as identified by the sequence indices listed in its tuple identifier) may be combined with any other 4-tuple to produce a resultant tuple. For example, the [0234] 4-tuple combined with the [0235] 4-tuple produces the [02345] 5-tuple. The same [0234] 4-tuple combined with the [0145] 4-tuple produces the [012345] 6-tuple.

It should thus be appreciated from the foregoing that combinations of 4-tuples can produce a tuple at the next-higher order [i.e., 5-order] as well as a still-higher 6-order tuple. In general, combination of n-tuples may produce resultant tuples at the next-higher [i.e., (n+1)] or at still-higher [i.e., (n+2) or above] orders, up to the (k−1)-order. The order of the resultant tuple is determined by the number of different sequence indices in the tuple identifiers of one tuple as against the sequence indices in the tuple identifier of the other tuple being pair-wise combined. If "p" is the number of different sequence indices in the tuple identifiers of one tuple as against the sequence indices in the tuple identifier of the other tuple with which it is being pair-wise combined, then resultant tuple is an (n+p)-tuple.

This "leapfrog effect", i.e., jumping to higher order tuples, is especially advantageous when large numbers of long sequences are involved. Leapfrogging to higher order tuples allows patterns having high levels of support to be found without the necessity of first finding all patterns at all lower levels of support.

However, the ability to leap to higher order tuples has a cost. Pair-wise combinations of n-tuples of the same order result in redundant pattern identifications. For example, if the [0234] 4-tuple is combined with the combined with the [0245] 4-tuple the same [02345] 5-tuple as produced earlier is again produced.

In order to reduce redundant pattern identifications the representations of the patterns in a first n-tuple should be only combined with pattern representations of those other n-tuples that include in their tuple identifiers at least one sequence index greater than the sequence indices included in the tuple identifier of the first n-tuple. For example, if the highest sequence index in the tuple identifier of a first n-tuple is the number "x", in order to avoid redundant identifications, that n-tuple should only be combined with those n-tuples whose tuple identifier includes at least one sequence index having a value greater than "x".

Redundancies involving pair-wise combinations of n-tuples that share the same reference sequence may be eliminated provided that, aside from the reference sequence, all of the sequence indices in the identifier of one n-tuple are different from those of the other n-tuple.

The pattern representations in any higher order tuple may also be combined pair-wise with the pattern representations of any selected lower-order tuple. That is, the representations in any n-tuple may be combined with the pattern representations in any selected m-tuple, where m may have any integer value from 2 to (n−1). The resulting tuple may be one order higher or more than one order higher (leapfrog effect), again depending upon the number of different sequence indices in the tuple identifiers of the tuples combined.

Referring to FIG. 15, for example, the 4-tuple [1245] when combined with the 3-tuple [126] produces the 5-tuple [12456]. This combination is shown in FIG. 15 with dashed connecting lines. The same starting 4-tuple [1245], when combined with the 3-tuple [136] produces the 6-tuple [123456]. This combination is shown in FIG. 15 with dot-dash connecting lines. The 4-tuple [1245] may also be combined with a 2-tuple, e.g., the 2-tuple [13], to produce the 5-tuple [12345]. This combination is shown in FIG. 15 with solid connecting lines.

Pair-wise combinations of an n-tuple with a lower order tuple may also result in redundant pattern identifications. For example, if the [1245] 4-tuple is combined with the combined with the [156] 3-tuple the same [12456] 5-tuple is again produced.

Accordingly, in order to reduce redundant pattern identifications the representations of the patterns in an n-tuple should be only combined with pattern representations of a lower-order tuple that includes in its tuple identifier at least one sequence index greater than the sequence indices included in the tuple identifier of the n-tuple. If the highest sequence index in the tuple identifier of the n-tuple is the number "y", that n-tuple should only be combined with a lower-order tuple whose tuple identifier includes at least one sequence index having a value greater than "y".

To eliminate redundancies involving pair-wise combinations of representations of patterns in an n-tuple with a lower order tuple that shares the same reference sequence, all of the sequence indices of the lower order tuple other than the reference sequence index must be different from those of the n-tuple.

The most preferred pair-wise combinations are those involving the representations of patterns in an n-tuple with the representations of patterns in a 2-tuple that shares the same reference sequence and whose tuple identifier includes a sequence index greater than the sequence indices included in the identification of the n-tuple, provided there exists patterns in each n-tuple and 2-tuple. Combining an n-tuple with such a 2-tuple insures that no redundant pattern representations are produced by the comparison, while finding all patterns at successive levels of support.

Figure 16A:
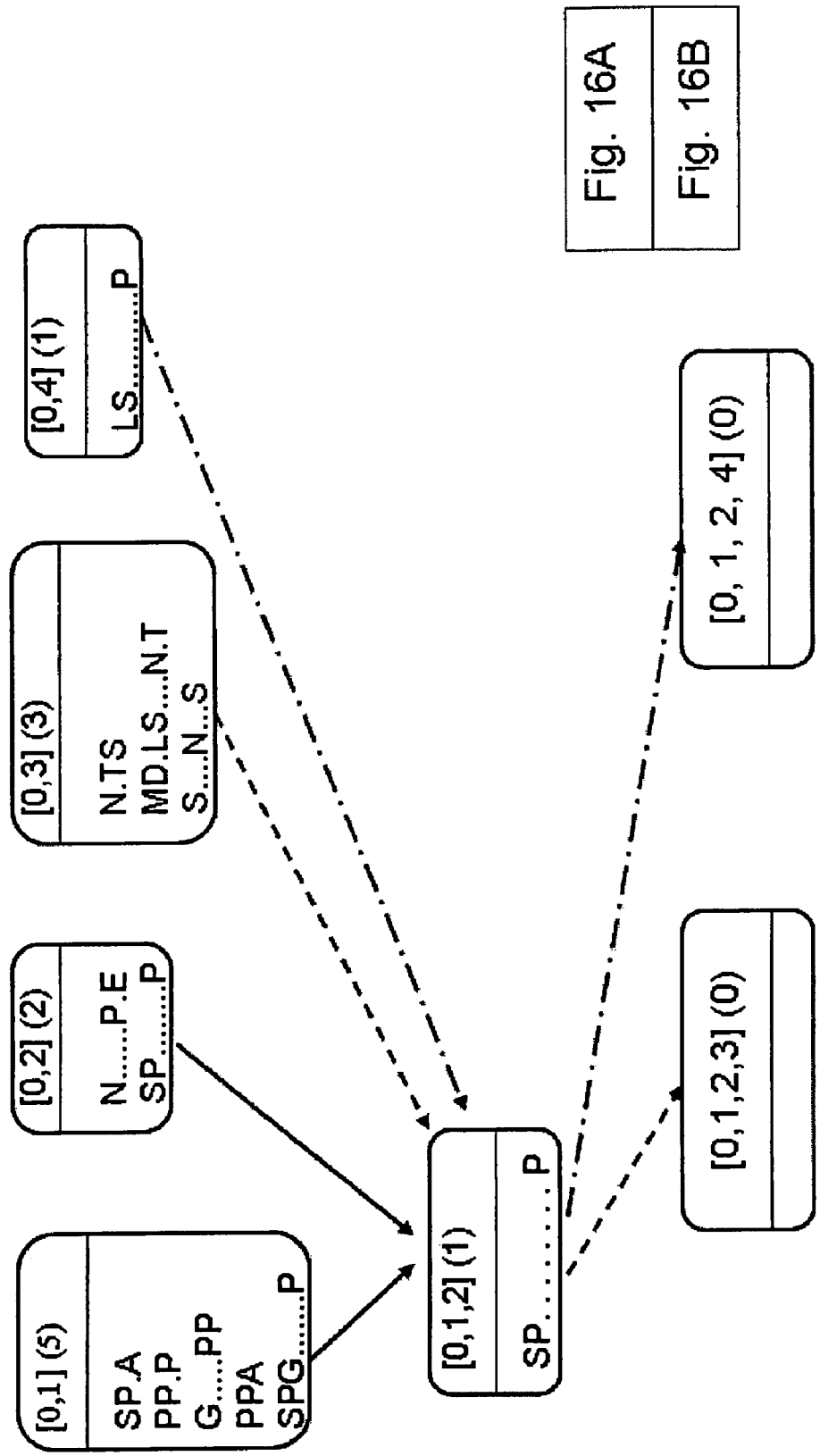
FIGS. 16A and 16B illustrate the combination of patterns in the 3-tuples shown in FIGS. 9A, 9B with the patterns in 2-tuples having a sequence index in the tuple identifier that is higher than the sequence indices in the tuple identifier of the 3-tuple to identify patterns in 4-tuples, the FIGS. 16A and 16B being relatively positioned with respect to each other as indicated in the relational drawing shown in FIG. 16A.
Figure 16B:
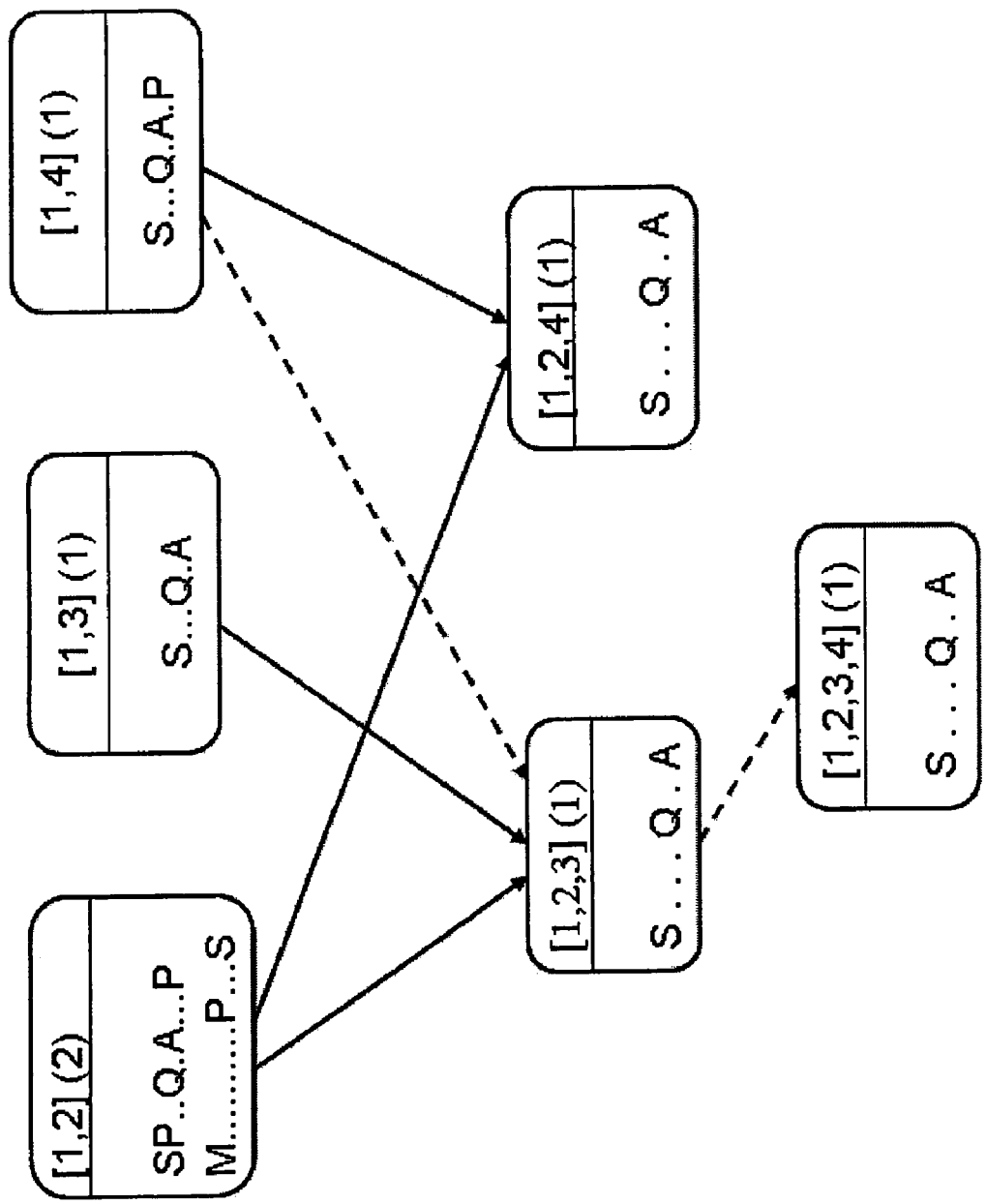

An example of these most preferred pair-wise combinations is shown in FIG. 16A, 16B. Each of the 3-tuples (i.e., n=3) created using the techniques of FIGS. 11A and 11B, FIGS. 13A and 13B, or FIG. 14 is combined only with 2-tuples that share a common reference sequence and include in their identification a sequence index greater than the sequence indices included in the identification of the 3-tuple.

As seen from FIG. 16A, in order to avoid redundancies the [0,1,2] 3-tuple should be combined only with 2-tuples that have the sequence $S_0$ as their reference sequence and that include in their identifiers a sequence index higher that the sequence index "2". These 2-tuples are the [0,3] and [0,4] 2-tuples.

The combination of the [0,1,2] 3-tuple with the [0,3] 2-tuple is indicated by the dashed lines. The next-higher order tuple resulting from this combination is the [0,1 2,3] 4-tuple. The combination of the [0,1,2] 3-tuple with the [0,4] 2-tuple is indicated by the dot-dash lines. The next-higher order tuple resulting from this combination is the [0,1,2,4] 4-tuple.

Similarly, as seen from FIG. 16B the only 2-tuple available for combination with the [1,2,3] 3-tuple in a manner that avoids redundancy is the [1,4] 2-tuples. Only this 2-tuple shares the reference sequence $S_1$ and includes in its tuple identifier a sequence index higher that the sequence index "3". This combination is indicated by the dashed line.

-o-0-o-

The methods of the present invention may be implemented using any suitable computing system, such as a desktop personal computer running under any operating system, such as Windows® (Microsoft Corporation, Redmond, Wash.). Alternatively, a workstation such as that available from Sun MicroSystems, Inc., running under a Unix-based operating system may be used. Computer architectures employing wider internal data busses accommodating longer word lengths (e.g., greater than 32 bits) are believed most advantageous.

The program of instructions (typically written in C++ language) and data structures of the present invention may be stored on any suitable computer readable medium, such as a magnetic storage medium (such as a "hard disc" or a "floppy disc"), an optical storage medium (such as a "CD-ROM"), or semiconductor storage medium [such as static or dynamic random access memory (RAM)].

While all of the methods described above operate in a computer-efficient manner, those employing the position index binary array (PIBA) representations of patterns are believed to be the most computer-efficient. That is, they require the minimum of computer resources (amount of memory, number of registers) and execute in the minimum number of machine-language instructions (number of CPU cycles).

The methods employing the position index binary array (PIBA) representations of patterns can also benefit from the use of a vector processor, i.e., an auxiliary processor device that operates on arrays in a single machine cycle. Vector processors having long word lengths, where each word can accommodate an entire position index binary array of patterns representations are especially advantageous. The logical AND-ing of entire position index binary array representations of patterns in a single CPU cycle further reduces the time required for a computer to perform the method of the present invention.

Those skilled in the art, having the benefits of the teachings of the present invention as hereinabove set forth, may effect numerous modifications thereto. Such modifications are to be construed as lying within the contemplation of the present invention, as defined by the appended claims.

What is claimed is:

1. A method for identifying patterns in a set of k-sequences of symbols, where k is greater than or equal to two, and wherein the location of a symbol in a sequence is denoted by a position index, the method comprising the steps of:
   (a) identifying a 2-tuple of patterns of symbols common to each pair-wise combination of sequences;
   (b) for each pattern of symbols in each identified 2-tuple of patterns, creating a position index numerical array (PINA) representing that pattern,
   each position index numerical array (PINA) comprising a set of position indices, each position index in the set denoting the location in a selected reference sequence at which each symbol in that pattern occurs; and
   (c) taking all 2-tuples that share a common reference sequence in pair-wise combination,
       (i) converting the position index numerical array (PINA) representing each of the patterns in one of the 2-tuples into a corresponding position index binary array (PIBA) representing that pattern,
       each position index binary array (PIBA) comprising a set of binary digits,
       the binary digit in each place in a position index binary array (PIBA) that corresponds to a location in the selected reference sequence of a symbol in a pattern being a first predetermined binary value, all other binary digits in the position index binary array (PIBA) being a second predetermined binary value; and
       (ii) using each position index in each position index numerical array (PINA) in the other 2-tuple to interrogate the places in the binary arrays of the first 2-tuple, thereby to identify those places in each binary array in the first 2-tuple having the first predetermined binary value.

2. The method of claim 1 further comprising the step of:
   (d) identifying the pattern of symbols in the reference sequence at the locations therein corresponding to the identified places in the position index binary arrays (PIBA's) having the first predetermined binary value.

3. The method of claim 1 further comprising the step of:
   (d) using the identifies of those places in each binary array in the first 2-tuple having the first predetermined binary value to define one or more position index numerical arrays (PINAs) that each represent a pattern in a 3-tuple of patterns.

4. The method of claim 3 further comprising the step of:
   (e) converting the one or more position index numerical arrays (PINAs) of the patterns in the 3-tuple of patterns defined in step (d) into the symbols represented thereby.

5. A method for identifying patterns in a set of k-sequences of symbols, where k is greater than or equal to two, and wherein the location of a symbol in a sequence is denoted by a position index, the method comprising the steps of:
   (a) identifying a 2-tuple of patterns of symbols common to each pair-wise combination of sequences;
   (b) taking all 2-tuples that share a common reference sequence in pair-wise combination,
       (i) for each pattern of symbols in a first identified 2-tuple of patterns, creating a position index binary array (PIBA) representing that pattern,
       each position index binary array (PIBA) comprising a set of binary digits,
       the binary digit in each place in a position index binary array (PIBA) that corresponds to a location in a selected reference sequence of a symbol in a pattern being a first predetermined binary value, all other binary digits in the position index binary array (PIBA) being a second predetermined binary value; and (ii) for each pattern of symbols in the second identified 2-tuple of patterns, creating a position index numerical array (PINA) representing that pattern, each position index numerical array (PINA) comprising a set of position indices, each position index in the set denoting the location in the selected reference sequence at which each symbol in that pattern occurs; and (c) using each position index in each position index numerical array (PINA) in the second 2-tuple to interrogate the places in the binary arrays of the first 2-tuple, thereby to identify those places in each binary array in the first 2-tuple having the first predetermined binary value.

6. The method of claim 5 further comprising the step of:
(d) identifying the pattern of symbols in the reference sequence at the locations therein corresponding to the identified places in the position index binary arrays (PIBA's) having the first predetermined binary value.

7. The method of claim 5 further comprising the step of:
(d) using the identifies of those places in each binary array in the first 2-tuple having the first predetermined binary value to define one or more position index numerical arrays (PINAs) that each represent a pattern in a 3-tuple of patterns.

8. The method of claim 7 further comprising the step of:
(e) converting the one or more position index numerical arrays (PINAs) of the patterns in the 3-tuple of patterns defined in step (d) into the symbols represented thereby.

9. A computer-readable medium containing instructions for controlling a computer system to identify patterns in a set of k-sequences of symbols, where k is greater than or equal to two, and wherein the location of a symbol in a sequence is denoted by a position index, by performing the steps of:

(a) identifying a 2-tuple of patterns of symbols common to each pair-wise combination of sequences;

(b) for each pattern of symbols in each identified 2-tuple of patterns, creating a position index numerical (PINA) representing that pattern, each position index numerical array (PINA) comprising a set of position indices, each position index in the set denoting the location in a selected reference sequence at which each symbol in that pattern occurs; and (c) taking all 2-tuples that share a common reference sequence in pair-wise combination, (i) converting the position index numerical array (PINA) representing each of the patterns in one of the 2-tuples into a corresponding position index binary array (PIBA) representing that pattern, each position index binary array (PIBA) comprising a set of binary digits, the binary digit in each place in a position index array (PIBA) that corresponds to a location in the selected reference sequence of a symbol in a pattern being a first predetermined binary value, all other binary digits in the position index binary array (PIBA) being a second predetermined binary value; and (ii) using each position index in each position index numerical array (PINA) in the other 2-tuple to interrogate the places in the binary arrays of the first 2-tuple, thereby to identify those places in each binary array in the first 2-tuple having the first predetermined binary value.

10. The computer-readable medium of claim 9 further comprising the step of:
(d) identifying the pattern of symbols in the reference sequence at the locations therein corresponding to the identified places in the position index binary arrays (PIBA's) having the first predetermined binary value.

11. The computer-readable medium of claim 9 further comprising the step of:
(d) using the identifies of those places in each binary array in the first 2-tuple having the first predetermined binary value to define one or more position index numerical arrays (PINAs) that each represent a pattern in a 3-tuple of patterns.

12. The computer-readable medium of claim 11 further comprising the step of:
(e) converting the one or more position index numerical arrays (PINAs) of the patterns in the 3-tuple of patterns defined in step (d) into the symbols represented thereby.

13. A computer-readable medium containing instructions for controlling a computer system to identify patterns in a set of k-sequences of symbols, where k is greater than or equal to two, and wherein the location of a symbol in a sequence is denoted by a position index, by performing the steps of:

(a) identifying a 2-tuple of patterns of symbols common to each pair-wise combination of sequences;

(b) taking all 2-tuples that share a common reference sequence in pair-wise combination, (i) for each pattern of symbols in a first identified 2-tuple of patterns, creating a position index binary array (PIBA) representing that pattern, each position index binary array (PIBA) comprising a set of binary digits, the binary digit in each place in a position index binary array (PIBA) that corresponds to a location in a selected reference sequence of a symbol in a pattern being a first predetermined binary value, all other binary digits in the position index binary array (PIBA) being a second predetermined binary value; and (ii) for each pattern of symbols in the second identified 2-tuple of patterns, creating a position index numerical array (PINA) representing that pattern, each position index numerical array (PINA) comprising a set of position indices, each position index in the set denoting the location in the selected reference sequence at which each symbol in that pattern occurs; and (c) using each position index in each position index numerical array (PINA) in the second 2-tuple to interrogate the places in the binary arrays of the first 2-tuple, thereby to identify those places in each binary array in the first 2-tuple having the first predetermined binary value.

14. The computer-readable medium of claim 13 further comprising the step of:
(d) identifying the pattern of symbols in the reference sequence at the locations therein corresponding to the identified places in the position index binary arrays (PIBA's) having the first predetermined binary value.

15. The computer-readable medium of claim 13 further comprising the step of:
(d) using the identifies of those places in each binary array in the first 2-tuple having the first predetermined binary value to define one or more position index numerical arrays (PINAs) that each represent a pattern in a 3-tuple of patterns.

16. The computer-readable medium of claim 15 further comprising the step of:
(e) converting the one or more position index numerical arrays (PINAs) of the patterns in the 3-tuple of patterns defined in step (d) into the symbols represented thereby.

* * * * *